(12) United States Patent
Arbabi et al.

(10) Patent No.: US 11,378,797 B2
(45) Date of Patent: Jul. 5, 2022

(54) FOCUSING DEVICE COMPRISING A PLURALITY OF SCATTERERS AND BEAM SCANNER AND SCOPE DEVICE

(71) Applicants: SAMSUNG ELECTRONICS CO., LTD., Suwon-si (KR); CALIFORNIA INSTITUTE OF TECHNOLOGY, Pasadena, CA (US)

(72) Inventors: Amir Arbabi, Pasadena, CA (US); Seunghoon Han, Seoul (KR); Andrei Faraon, Pasadena, CA (US); Hyeonsoo Park, Suwon-si (KR)

(73) Assignees: SAMSUNG ELECTRONICS CO., LTD., Suwon-si (KR); CALIFORNIA INSTITUTE OF TECHNOLOGY, Pasadena, CA (US)

( * ) Notice: Subject to any disclaimer, the term of this patent is extended or adjusted under 35 U.S.C. 154(b) by 230 days.

(21) Appl. No.: 16/582,049

(22) Filed: Sep. 25, 2019

(65) Prior Publication Data
US 2020/0166744 A1 May 28, 2020

Related U.S. Application Data

(63) Continuation-in-part of application No. 15/987,090, filed on May 23, 2018, now Pat. No. 10,712,554, (Continued)

(30) Foreign Application Priority Data

Feb. 5, 2016 (KR) .......................... 10-2016-0014992

(51) Int. Cl.
*G02B 5/30* (2006.01)
*G02B 27/00* (2006.01)
(Continued)

(52) U.S. Cl.
CPC ....... *G02B 27/0031* (2013.01); *G02B 5/0263* (2013.01); *G02B 5/0294* (2013.01);
(Continued)

(58) Field of Classification Search
CPC G02B 3/0087; G02B 27/0025; G02B 27/005; G02B 27/0068; G02B 1/00; G02B 1/002; G02B 1/005; G02B 1/007
(Continued)

(56) References Cited

U.S. PATENT DOCUMENTS 9,995,930 B2 * 6/2018 Arbabi ............... G02B 27/0955
10,712,554 B2 * 7/2020 Arbabi ................ G02B 5/0294
(Continued)

FOREIGN PATENT DOCUMENTS

JP 4903590 B2 3/2012
KR 101429093 B1 8/2014

OTHER PUBLICATIONS

Caroline Perry, "Perfect colors, captured with one ultra-thin lens", Harvard John A. Paulson School of Engineering and Applied Sciences, Feb. 19, 2015, Total 7 pages, URL: http://www.seas.harvard.edu/news/2015/02/perfect-colors-captured-with-one-ultra-thin-lens.
(Continued)

*Primary Examiner* — Arnel C Lavarias
(74) *Attorney, Agent, or Firm* — Sughrue Mion, PLLC

(57) ABSTRACT

Provided is a focusing device that includes a substrate and a plurality of scatterers provided at both sides of the substrate. The scatterers on the both sides of the focusing device may correct geometric aberration, and thus, a field of view (FOV) of the focusing device may be widened.

20 Claims, 37 Drawing Sheets

Related U.S. Application Data which is a continuation of application No. 15/093,987, filed on Apr. 8, 2016, now Pat. No. 9,995,930.

(60) Provisional application No. 62/144,750, filed on Apr. 8, 2015.

(51) Int. Cl.
  *G02B 27/42* (2006.01)
  *G02B 5/18* (2006.01)
  *G02B 27/09* (2006.01)
  *G02B 23/00* (2006.01)
  *G02B 5/02* (2006.01)
  *G02B 3/00* (2006.01)

(52) U.S. Cl.
  CPC ......... *G02B 5/1876* (2013.01); *G02B 5/3083* (2013.01); *G02B 23/00* (2013.01); *G02B 27/005* (2013.01); *G02B 27/0927* (2013.01); *G02B 27/0955* (2013.01); *G02B 27/4216* (2013.01); *G02B 27/4272* (2013.01); *G02B 3/0087* (2013.01)

(58) Field of Classification Search
  USPC ....... 359/362, 363, 619, 920, 621, 622, 623, 359/625, 626, 628, 642, 648, 651, 652, 359/653, 721, 724, 737, 741
  See application file for complete search history.

(56) References Cited

U.S. PATENT DOCUMENTS

| | | |
|---|---|---|
| 2009/0097381 A1 | 4/2009 | Hamano et al. |
| 2012/0328240 A1 | 12/2012 | Ma et al. |
| 2014/0277433 A1 | 9/2014 | Pugh et al. |
| 2015/0219806 A1 | 8/2015 | Arbabi |
| 2016/0077261 A1 | 3/2016 | Arbabi |
| 2016/0306079 A1 | 10/2016 | Arbabi |
| 2016/0320531 A1 | 11/2016 | Kamali |
| 2017/0045652 A1 | 2/2017 | Arbabi |

OTHER PUBLICATIONS

Amir Arbabi et al., "Subwavelength-thick Lenses with High Numerical Apertures and Large Efficiency Based on High Contrast Transmitarrays", Physics.Optics, Oct. 30, 2014, Total 10 pages.

Amir Arbabi et al., "Aplanatic Metasurface Flat Lens", Apr. 23, 2015, Total 13 pages.

F. Aieta, P. Genevet, M. Kats, N. Yu, R. Blanchard, Z. Gaburro, F. Capasso, 'Aberration-free ultrathin flat Tenses and axicons at telecom wavelengths based on plasmonic metasurfaces', Nano Letters, v. 12, pp. 4932-4936, 2012.

F. Aieta, P. Genevet, M. Kats, F. Capasso, Aberration of flat lenses and aplanatic metasurfaces, Optics Express, v. 21, No. 25, p. 31530-31539, 2013.

\* cited by examiner 830 nm

5μm 850 nm

5μm 870 nm

5μm

FOCUSING DEVICE COMPRISING A PLURALITY OF SCATTERERS AND BEAM SCANNER AND SCOPE DEVICE

CROSS-REFERENCE TO RELATED APPLICATIONS

This application is a continuation in part application of U.S. patent application Ser. No. 15/987,090, filed on May 23, 2018, which is a continuation of application Ser. No. 15/093,987, filed on Apr. 8, 2016, now U.S. Pat. No. 995,930, issued on Jun. 12, 2018, which claims the benefit of U.S. Provisional Patent Application 62/144,750, filed on Apr. 8, 2015, in the U.S. Patent and Trademark Office, and Korean Patent Application No. 10-2016-0014992, filed on Feb. 5, 2016, in the Korean Intellectual Property Office, the disclosures of which are incorporated herein in their entireties by reference.

STATEMENT REGARDING FEDERALLY SPONSORED RESEARCH OR DEVELOPMENT

This invention was made with government support under Grant No. W911NF-14-1-0345 awarded by the U.S. Army. The government has certain rights in the invention.

BACKGROUND

1. Field

Apparatuses and methods consistent with the present disclosure relate to a focusing device, and a beam scanner and a scope device that use the focusing device as an optical path modifier.

2. Description of the Related Art

Optical sensors using semiconductor-based sensor arrays are widely used in mobile devices, wearable devices, and the Internet of Things (IoT). Although size reduction of the aforementioned devices is desired, it is difficult to reduce the thickness of focusing devices in the aforementioned devices.

Also, due to the increased use of 3-dimensional (3D) image sensors in the IoT, gaming devices, and other mobile devices, focusing devices for adjusting a path of light incident on the 3D image sensors are required. However, the fields of view of the focusing devices may be limited by coma aberration of the focusing devices. Thus, research has been conducted to combine a plurality of optical lenses and thus remove coma aberration. However, since a substantial amount of space is necessary to combine a plurality of optical lenses, it is difficult to reduce the size of the focusing devices.

SUMMARY

Additional aspects will be set forth in part in the description which follows and, in part, will be apparent from the description, or may be learned by practice of the presented exemplary embodiments.

According to an aspect of an exemplary embodiment, a focusing device includes a substrate; a first thin lens provided at a first surface of the substrate and comprising a plurality of first scatterers; and a second thin lens provided at a second surface of the substrate and comprising a plurality of second scatterers. The first scatterers of the first thin lens are configured to correct geometric aberration (field curvature, coma aberration, astigmatism, etc.) of the second thin lens.

The first and second thin lenses may be configured to allow light to form a focusing point on a focal plane regardless of an angle at which light is incident on the first surface.

A phase shift of light that passes through the second scatterers may decrease from a central area of the second thin lens to a peripheral area of the second thin lens.

A phase shift of light that passes through the first scatterers may decrease from a peripheral area of the first thin lens to a middle area of the first thin lens and increases again from the middle area of the first thin lens to a central area of the first thin lens.

The first and second thin lenses may be configured to change a location at which light is focused on the focal plane according to the angle at which the light is incident on the first surface.

The first and second thin lenses area configured to determine the location at which the light may be focused on the focal plane according to Equation 1:

$$h = f^* \tan\theta$$

wherein 'h' is a distance between the location of the focusing point and an optical axis of the focusing device, 'f' is an effective focal length of the focusing device, and 'θ' is the incident angle of light.

Respective refractive indexes of the first and second scatterers may be greater than a refractive index of the substrate.

The substrate may include at least one selected from glass (fused silica, BK7, etc.), quartz, polymer (PMMA, SU-8, etc.) and plastic, and the first and second scatterers comprise at least one selected from crystalline silicon (c-Si), polycrystalline silicon (poly Si), amorphous silicon (a-Si), and group III-V compound semiconductors (GaP, GAN, GaAs, etc.), SiC, $TiO_2$, and SiN.

The first and second scatterers may be configured to allow incident light within a wavelength band to form a focusing point on a focal plane.

Distances between the first scatterers and distances between the second scatterers may be less than wavelengths in the wavelength band.

Respective heights of the first scatterers and respective heights of the second scatterers may be less than wavelengths in the wavelength band.

The focusing device may further include an optical filter configured to block the incident light of wavelengths of outside the wavelength band.

At least one of respective shapes of the first and second scatterers and respective sizes of the first and second scatterers may change according to a thickness of the substrate.

Each of the first and second scatterers may have at least one of a cylindrical shape, a cylindroid shape, and a polyhedral pillar shape.

According to another aspect of an exemplary embodiment, a beam scanner includes an optical path modifier comprising a substrate, a first thin lens provided at a first surface of the substrate and comprising a plurality of first scatterers, and a second thin lens provided at a second surface of the substrate and comprising a plurality of second scatterers; and a light source array spaced apart from the second surface of the substrate and comprising a plurality of light sources. The first scatterers of the first thin lens are configured to correct coma aberration of the second thin lens.

The optical path modifier may change path of light emitted from the light sources according to respective locations of the light sources.

The optical path modifier may modify light emitted from one of the light sources into parallel rays.

According to another aspect of an exemplary embodiment, a scope device includes an object lens unit comprising a substrate; a first thin lens provided at a first surface of the substrate and comprising a plurality of first scatterers, and a second thin lens provided at a second surface of the substrate and comprising a plurality of second scatterers; and a light source facing the second surface of the substrate and configured to emit light on a target object. The first scatterers of the first thin lens are configured to correct coma aberration of the second thin lens.

Light emitted by the light source may have at least two wavelengths with different transmission rates with respect to the target object.

The light emitted by the light source may be scattered at different locations by the target object according to wavelengths of the light emitted by the light source. The object lens unit may be configured to change a path of the light according to the locations at which the light is scattered by the target object.

According to another aspect of an exemplary embodiment, a focusing device with respect to light of predetermined wavelength band includes: a substrate; a first thin lens provided at a first surface of the substrate and comprising a plurality of first scatterers; and a second thin lens provided at a second surface of the substrate and comprising a plurality of second scatterers, wherein the plurality of first scatterers of the first thin lens are configured to correct geometric aberration of the second thin lens, and wherein at least two of the plurality of second scatterers have different height to each other.

A height difference of the at least two second scatterer may be equal to or less than $2\lambda$, with respect to the wavelength $\lambda$ within the predetermined wavelength band.

A height H of the plurality of second scatterers may be in a range that $\lambda/2 \leq H \leq 3\lambda$, with respect to the wavelength $\lambda$ within the predetermined wavelength band.

The second thin lens may further include a low refractive index material layer covering the plurality of second scatterers and including a material having a refractive index lower than a refractive index of plurality of the second scatterers; and a plurality of third scatterer arranged on the low refractive index material layer and including a material having a refractive index higher than a refractive index of the low refractive index material layer.

The plurality of second scatterers and the plurality of third scatterers may face each other to be misaligned with each other.

A separation distance in a height direction between adjacent second and third scatterers among the plurality of second scatterers and the plurality of third scatterers may be greater than $\lambda/2$, with respect to the wavelength $\lambda$ within the predetermined wavelength band A shape distribution of the plurality of second scatterers and a shape distribution of the plurality of third scatterers may be determined to have different distributions of performance indexes by locations from each other.

The shape distribution of the plurality of second scatterers and the shape distribution of the plurality of third scatterers may be determined to mutually compensate for non-uniformity in focusing performance by locations.

At least two of the plurality of third scatterers may have different heights from each other.

A height difference between at least two of the plurality of third scatterers may be equal to or less than $2\lambda$, with respect to the wavelength $\lambda$ within the predetermined wavelength band.

A height H of a plurality of fourth scatterers may be in a range that $\lambda/2 \leq H \leq 3\lambda$, with respect to the wavelength $\lambda$ within the predetermined wavelength band.

At least two of the plurality of first scatterers may have different heights from each other.

The first thin lens may further include: a low refractive index material layer covering the plurality of first scatterers and including a material having a refractive index lower than a refractive index of the first scatterer; and a plurality of fourth scatterers arranged on the low refractive index material layer and including a material having a refractive index higher than a refractive index of the low refractive index material layer.

The plurality of first scatterers and the plurality of fourth scatterers may face each other to be misaligned with each other.

A separation distance in a height direction between adjacent first and fourth scatterers among the plurality of first scatterers and the plurality of fourth scatterers may be equal to or less than $\lambda/2$, with respect to the wavelength $\lambda$ within the predetermined wavelength band.

According to another aspect of the exemplary embodiment, a focusing device with respect to light of predetermined wavelength band includes: a substrate; a first thin lens provided at a first surface of the substrate and comprising a plurality of first scatterers; and a second thin lens provided at a second surface of the substrate and comprising a plurality of scatterers, wherein the plurality of first scatterers of the first thin lens are configured to correct geometric aberration of the second thin lens, and wherein the plurality of scatterers of the second thin lens are arranged in multi-layered structure.

The second thin lens may include: a plurality of second scatterers arranged on the second surface; a low refractive index material layer covering the plurality of second scatterers and including a material having a refractive index lower than a refractive index of the plurality of second scatterers; and a plurality of third scatterers arranged on the low refractive index material layer and including a material having a refractive index higher than a refractive index of the low refractive index material layer.

The plurality of second scatterers and the plurality of third scatterers may face each other to be misaligned with each other.

A shape distribution of the plurality of second scatterers and a shape distribution of the plurality of third scatterers may be determined to mutually compensate for non-uniformity in focusing performance by locations.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
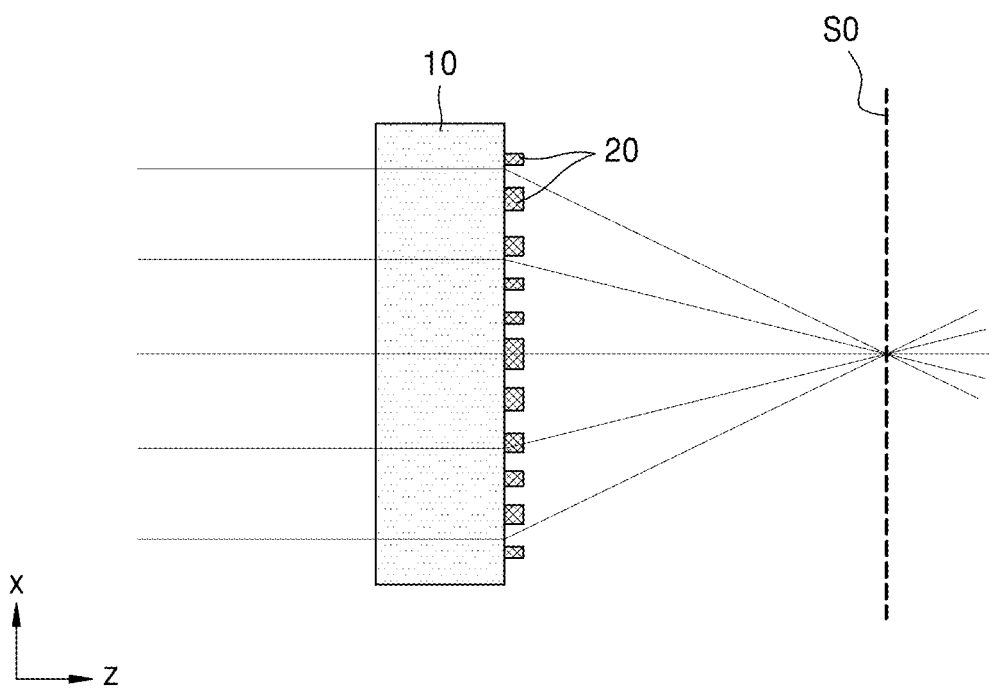
FIG. 1 is a diagram of a focusing device according to a comparative example.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. Expressions such as "at least one of," when preceding a list of elements, modify the entire list of elements and do not modify the individual elements of the list.

Reference will now be made in detail to exemplary embodiments, examples of which are illustrated in the accompanying drawings.

The terms used in the exemplary embodiments are selected as general terms used currently as widely as possible considering the functions in the present disclosure, but they may depend on the intentions of one of ordinary skill in the art, practice, the appearance of new technologies, etc. In specific cases, terms arbitrarily selected by the applicant are also used, and in such cases, their meaning will be described in detail. Thus, it should be noted that the terms used in the specification should be understood not based on their literal names but by their given definitions and descriptions through the specification.

Throughout the specification, it will also be understood that when an element is referred to as being "connected to" another element, it can be directly connected to the other element, or electrically connected to the other element while intervening elements may also be present. Also, when a part "includes" or "comprises" an element, unless there is a particular description contrary thereto, the part can further include other elements, not excluding the other elements. In addition, the terms such as "unit," "-er (-or)," and "module" described in the specification refer to an element for performing at least one function or operation, and may be implemented in hardware, software, or the combination of hardware and software.

The terms "configured of" or "includes" should not be construed as necessarily including all elements or operations described in the specification. It will be understood that some elements and some operations may not be included, or additional elements or operations may be further included.

While such terms as "first," "second," "A," "B," etc., may be used to describe various components, such components must not be limited to the above terms. The above terms are used only to distinguish one component from another.

The present exemplary embodiments may have different forms and should not be construed as being limited to the descriptions set forth herein. Elements and features that may be easily derived by one of ordinary skill in the art to which the present disclosure pertains are within the spirit and scope of the present disclosure as defined by the appended claims.

Hereinafter, the present exemplary embodiments will be described with reference to the accompanying drawings.

FIG. 1 is a diagram of a focusing device according to a comparative example.

Referring to FIG. 1, the focusing device according to the comparative example may include a substrate 10 and a plurality of scatterers 20 provided at a side of the substrate 10. In the focusing device of FIG. 1, a path of light exiting the substrate 10 may change as light passes through the plurality of scatterers 20. Shapes and materials of the plurality of scatterers 20 may vary according to functions performed by the plurality of scatterers 20. For example, the plurality of scatterers 20 of the focusing device of FIG. 1 may have a shape and a size appropriate for performing a function of a lens with positive refractive power. Also, as shown in FIG. 1, the plurality of scatterers 20 may allow light that is perpendicularly incident on the substrate 10 to form a focusing point at a focal plane S0.

Figure 2:
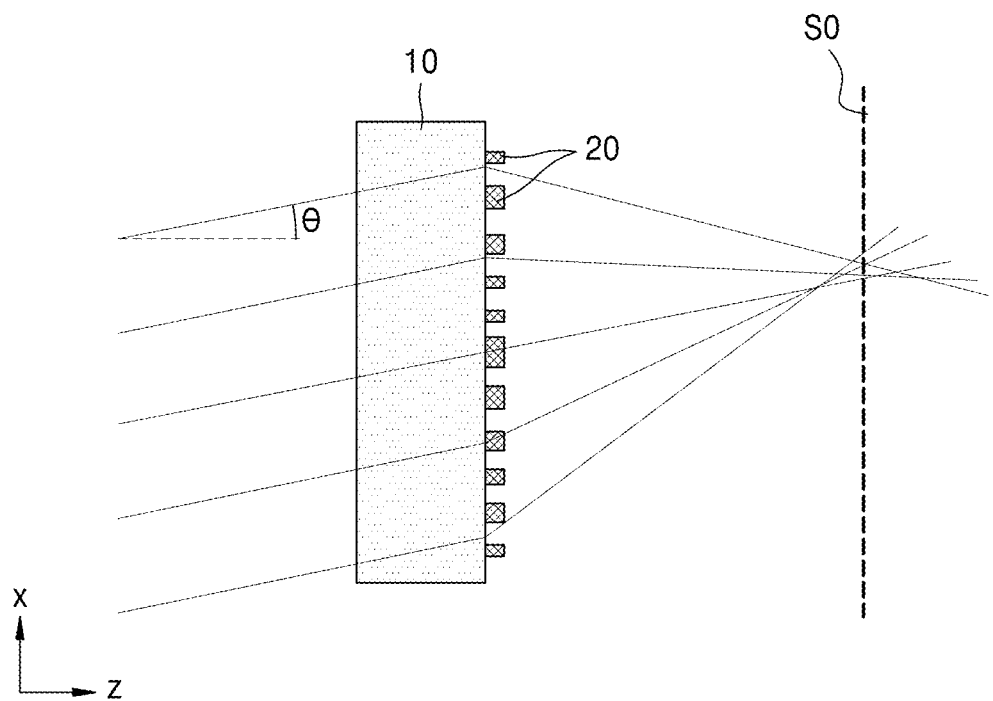
FIG. 2 is a diagram of an example in which light is obliquely incident with respect to an optical axis of the focusing device of FIG. 1.

FIG. 2 is a diagram of an example in which light is obliquely incident with respect to an optical axis (z-axis) of the focusing device of FIG. 1;

Referring to FIG. 2, light incident in a direction that is not parallel to the optical axis of the focusing device may pass through the plurality of scatterers 20 but not focus on a single focusing point. Such phenomenon is referred to as geometric aberration. The geometric aberration may include coma aberration and field of curvature aberration. The aforementioned geometric aberration may decrease sharpness of images formed by the focusing device. Also, the geometric aberration limits a field of view (FOV) of the focusing device.

Figure 3A:
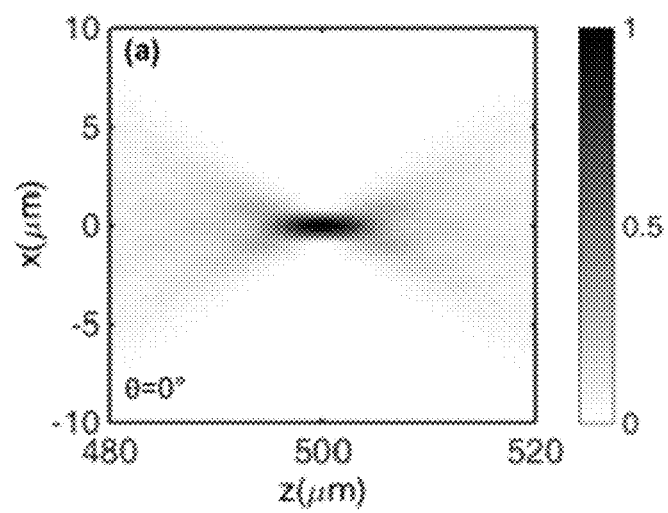
FIGS. 3A to 3C are diagrams of light intensity distribution of a focal plane.
Figure 3B:
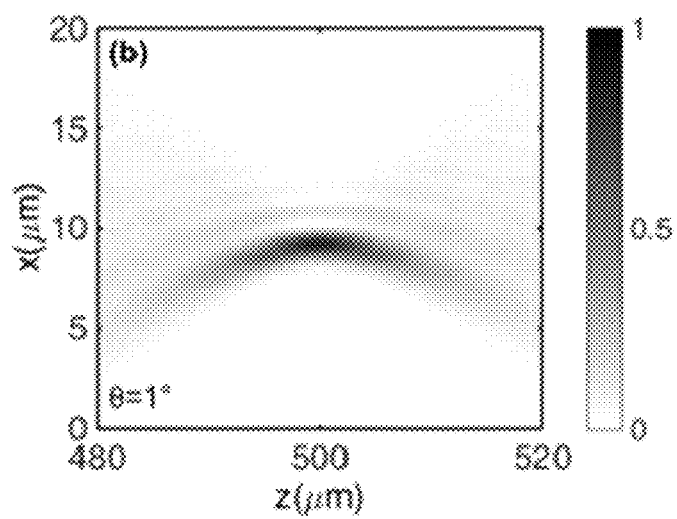
Figure 3C:
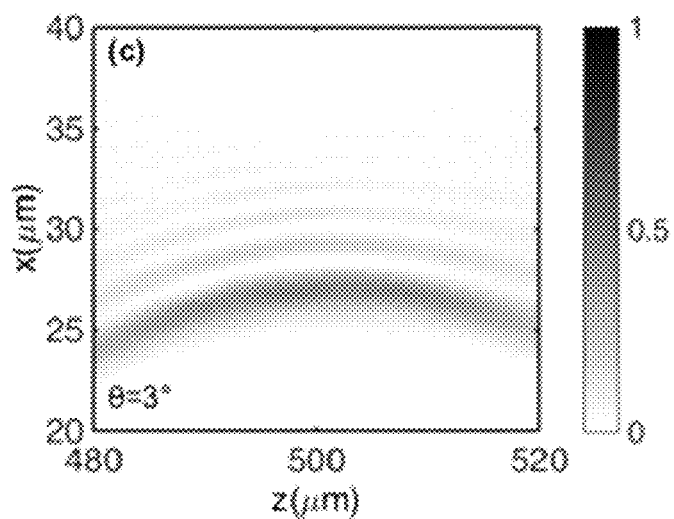

FIGS. 3A to 3C are diagrams of light intensity distribution of a focal plane.

FIG. 3A shows light intensity distribution of an image formed by light that is parallel to the optical axis (z-axis) of the focusing device. FIG. 3B shows light intensity distribution of an image formed by light incident at an incident angle of 1° with respect to the optical axis. FIG. 3C shows light intensity distribution of an image formed by light incident at an incident angle of 3° with respect to the optical axis. Bars at a right hand side of FIGS. 3A to 3B indicates relative intensity of light.

Referring to FIG. 3A, when an incident angle of light is 0° (i.e., when light is parallel to the optical axis of the focusing device), an area with high light intensity distribution may be narrow. That is, a focusing effect of the focusing device may be relatively excellent. Referring to FIG. 3B, when the incident angle of light is 1°, an area with high intensity of light is wide. As the incident angle of light increases, the focusing effect of the focusing device may decrease. Referring to FIG. 3C, when the incident angle of light is 3°, intensity of light may decrease in a central area of the image. However, peripheral areas of the image may have greater intensity of light as the incident angle increases. That is, even when the incident angle of light increases by a small amount, the focusing effect of the focusing device may substantially decrease.

Figure 4A:
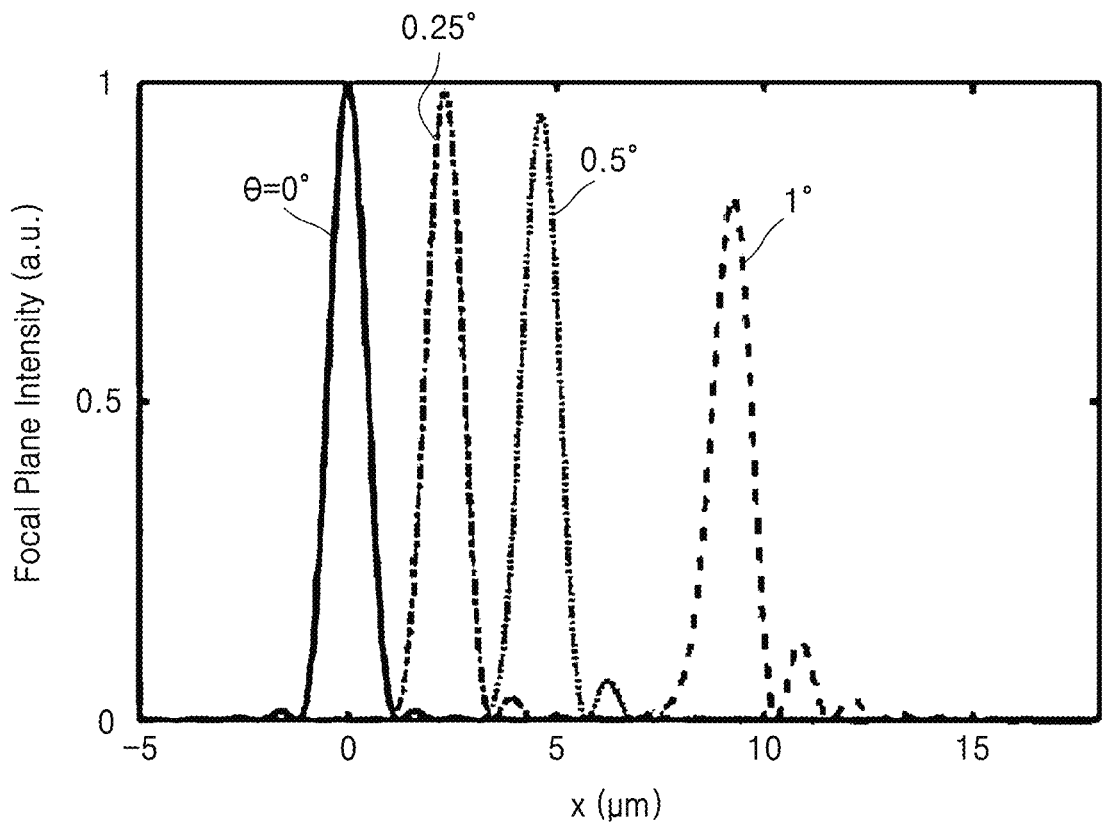
FIGS. 4A and 4B are diagrams of light intensity distribution on the focal plane according to incident angles of light.
Figure 4B:
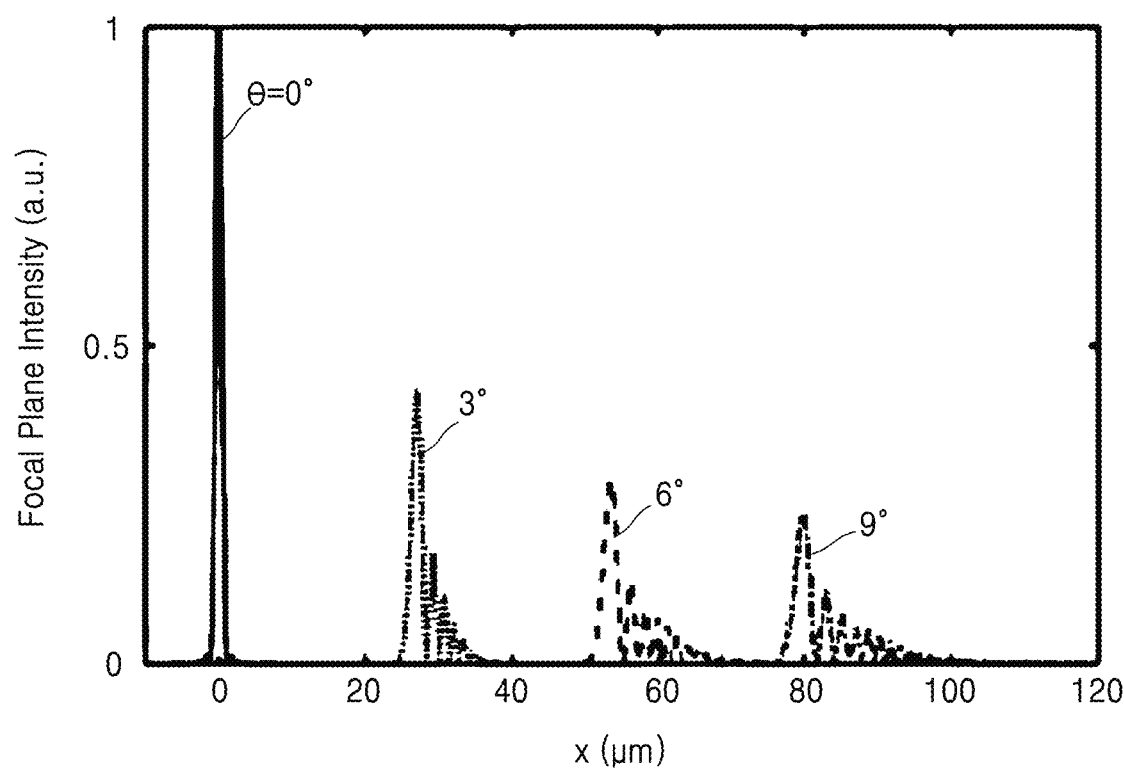

FIGS. 4A and 4B are diagrams of light intensity distribution on the focal plane S0 according to incident angles of light.

Referring to FIG. 4A, as the incident angle of light increases, peaks may be differently located in a graph of light intensity distribution. Also, as the incident angle increases, the graph of light intensity distribution may be widened and peak values may decrease. Referring to FIG. 4B, when the incident angle is 3° or higher, peak values of the light intensity distribution may decrease below more than half of peak values of when the incident angle is 0°. Also, a range of light intensity distribution may substantially increase. When the incident angle of light exceeds about 1°, image distortion due to coma aberration may increase.

Figure 5:
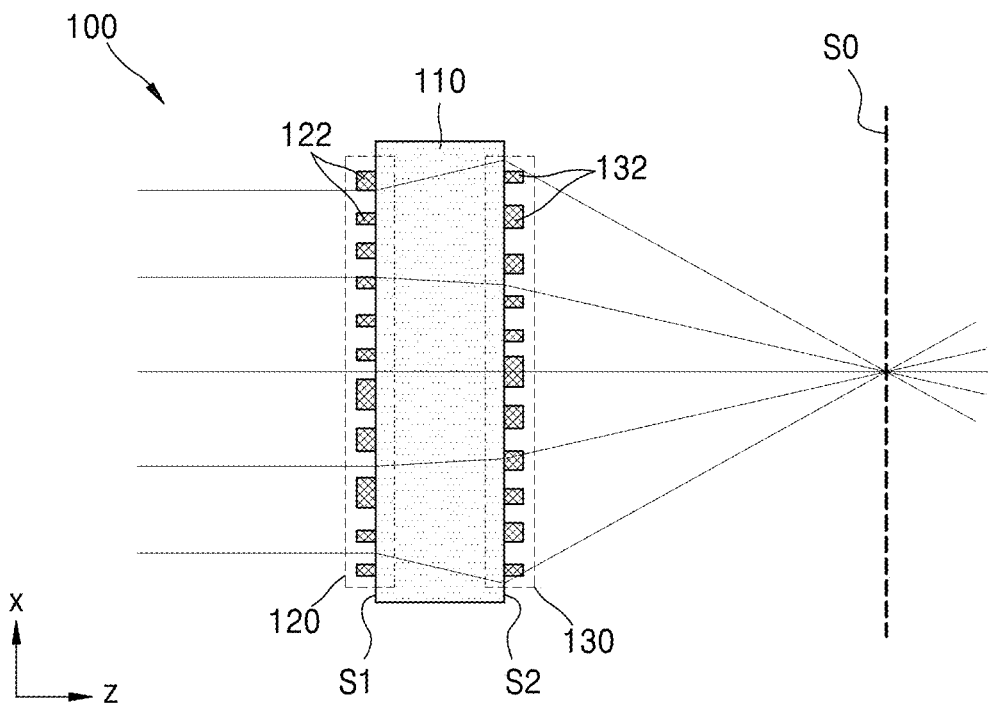
FIG. 5 is a focusing device according to an exemplary embodiment.

FIG. 5 is a focusing device 100 according to an exemplary embodiment.

Referring to FIG. 5, the focusing device 100 according to an exemplary embodiment may include a substrate 110, a first thin lens 120 including a plurality of first scatterers 122 provided on a first surface S1 of the substrate 110, and a second thin lens 130 including a plurality of second scatterers 132 provided on a second surface S2 of the substrate 110.

The substrate 110 may be shaped as a plate. The first and second surfaces S1 and S2 of the substrate 110 may be substantially parallel to each other. However, the first and second surfaces S1 and S2 do not have to be completely parallel to each other but may be oblique with respect to each other. The substrate 110 may include a transparent material. The transparent material indicates a material with a high light transmission rate. For example, the substrate 110 may include at least one selected from glass (fused silica, BK7, etc.), quartz, polymer (PMMA, SU-8, etc.), and plastic.

The first thin lens 120 may include the plurality of first scatterers 122 that are arranged on the first surface S1 of the substrate 110. Also, the second thin lens 130 may include the plurality of second scatterers 132 that are arranged on the second surface S2 of the substrate 110. Unlike optical lenses of the related art, the first and second thin lenses 120 and 130 may change a path of light by using the plurality of first and the plurality of second scatterers 122 and 132. The plurality of first and the plurality of second scatterers 122 and 132 may capture light incident near one another and resonate light inside the plurality of first and the plurality of second scatterers 122 and 132. The plurality of first and the plurality of second scatterers 122 and 132 may adjust transmission and reflection properties of the light incident on the plurality of first and the plurality of second scatterers 122 and 132. For example, the plurality of first and the plurality of second scatterers 122 and 132 may modulate at least one of an amplitude, phase, and polarization of transmitted light according to structures and included materials of the plurality of first and the plurality of second scatterers 122 and 132. The plurality of first and the plurality of second scatterers 122 and 132 may be arranged such that distribution of at least one of an amplitude, phase, and polarization of the transmitted light is modulated and thus a wavefront of the transmitted light changes with respect to a wavefront of the incident light. Therefore, the plurality of first and the plurality of second scatterers 122 and 132 may change a proceeding direction of the transmitted light with respect to that of the incident light.

The second thin lens 130 may function as a lens with positive refractive power. Shapes, sizes, materials, and an arrangement pattern of the plurality of second scatterers 132 may be modified so that the second thin lens 130 has positive refractive power. Also, the plurality of second scatterers 132 may be designed such that the second thin lens 130 does not cause spherical aberration. To do so, the shapes, the sizes, the materials, and the arrangement of the plurality of second scatterers 132 may vary according to a location on a surface of the substrate 110 where the plurality of second scatterers 132 are arranged.

Figure 6:
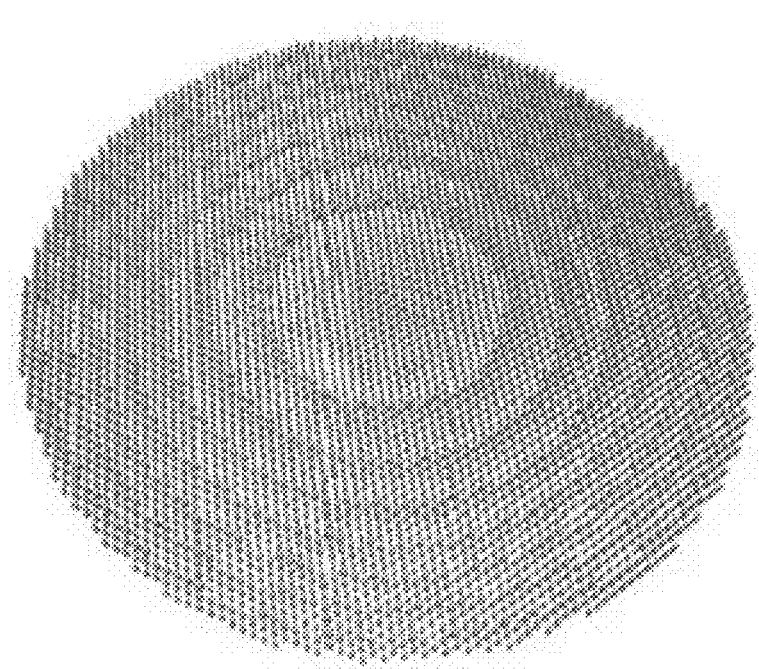
FIG. 6 is an exemplary diagram of a surface of a second thin lens.

FIG. 6 is an exemplary diagram of a surface of the second thin lens 130.

Referring to FIG. 6, the plurality of second scatterers 132 may be arranged on the surface of the second thin lens 130. Waveform of light that passed through the second thin lens 130 may vary according to shapes, arrangement intervals, and an arrangement pattern of the plurality of second scatterers 132. When the plurality of second scatterers 132 are arranged on the surface of the second thin lens 130 as shown in FIG. 6, the second thin lens 130 may function as a lens with positive refractive power.

The plurality of first scatterers 122 of the first thin lens 120 may be designed to correct coma aberration of the second thin lens 130. Shapes, materials, and arrangement pattern of the plurality of first scatterers 122 may vary depending on a thickness of the substrate 110 and the shapes, the materials, and the arrangement pattern of the plurality of second scatterers 132. In a general optical system, a plurality of optical lenses are combined to correct coma aberration of lenses. Therefore, the general optical system may be difficult to design and size reduction may be difficult. However, the focusing device 100 according to an exemplary embodiment may have the first and second thin lenses 120 and 130 on both surfaces of the substrate 110 by arranging the plurality of first and plurality of second scatterers 122 and 132 on the both surfaces of the substrate 110. Accordingly, size reduction of the focusing device 100 may become convenient. Also, since the first thin lens 120 may correct coma aberration of the second thin lens 130, the focusing device 100 may have a wide FOV.

Figure 7A:
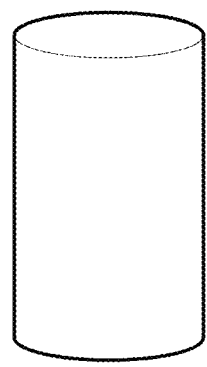
FIGS. 7A to 7C are perspective views of various shapes of first and second scatterers.
Figure 7B:
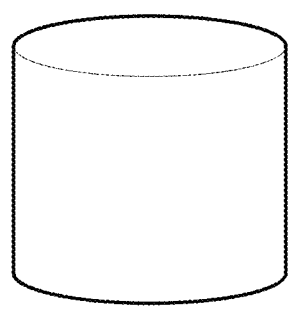
Figure 7C:
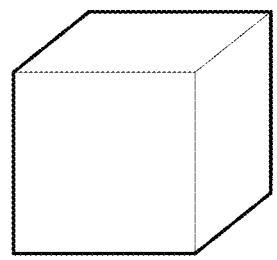

FIGS. 7A to 7C are perspective views of various shapes of the individual scatterers of plurality of first and plurality of second scatterers 122 and 132.

Referring to FIGS. 7A to 7C, the individual scatterers of the plurality of first and the individual scatterers of the plurality of second scatterers 122 and 132 in the first and second thin lenses 120 and 130 may have a pillar structure. Such pillar structure may have any one of circular, oval, rectangular, and square cross-sections. FIG. 7A shows a scatterer shaped as a pillar with a circular cross-section. FIG. 7B shows a scatterer shaped as a pillar with an oval cross-section. FIG. 7C shows a scatterer shaped as a pillar with a quadrilateral cross-section. The pillar structure may be inclined at an angle in a height direction.

Although exemplary shapes of the plurality of first and the plurality of second scatterers 122 and 132 are shown in FIGS. 7A to 7C, exemplary embodiments are not limited thereto. For example, the plurality of first and plurality of second scatterers 122 and 132 may be shaped as polyhedral pillars or pillars with an L-shaped cross-section. The shapes of the plurality of first and plurality of second scatterers 122 and 132 may be asymmetrical in a direction. For example, respective cross-sections of the plurality of first and the plurality of second scatterers 122 and 132 may be asymmetrical in a horizontal direction. Also, since the respective cross-sections of the plurality of first and the plurality of second scatterers 122 and 132 may vary according to respective heights of the plurality of first and the plurality of second scatterers 122 and 132, respective shapes of the plurality of first and the plurality of second scatterers 122 and 132 may be asymmetrical with respect to the respective heights thereof.

Respective refractive indexes of the plurality of first and the plurality of second scatterers 122 and 132 may be higher than a refractive index of the substrate 110. For example, the respective refractive indexes of the plurality of first and the plurality of second scatterers 122 and 132 may be greater than the refractive index of the substrate 110 by approximately 1 or more. Therefore, the substrate 110 may include a material with a relatively low refractive index, and the plurality of first and the plurality of second scatterers 122 and 132 may include a material with a relatively high refractive index. For example, the plurality of first and the plurality of second scatterers 122 and 132 may include at least one selected from crystalline silicon (c-Si), polycrystalline silicon (poly Si), amorphous silicon, $Si_3N_4$, GaP, GaAs, $TiO_2$, AlSb, AlAs, AlGaAs, AlGaInP, BP, and $ZnGeP_2$. The plurality of first and the plurality of second scatterers 122 and 132 may be additionally surrounded by materials with a low refractive index ($SiO_2$, polymer (PMMA, SU-8, etc.)) in upper and horizontal directions.

Figure 8A:
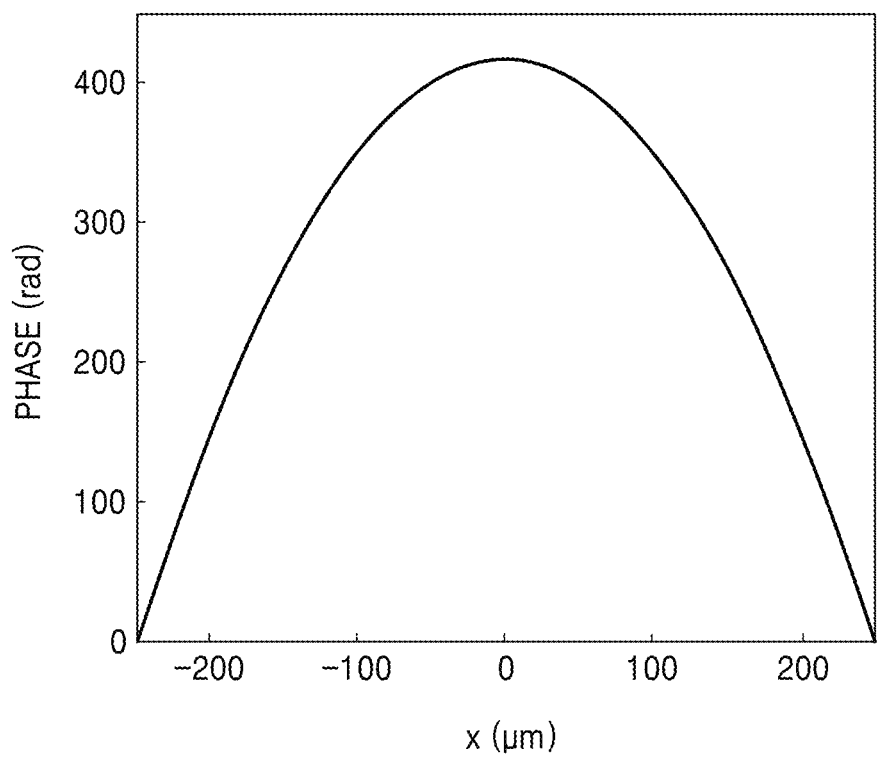
FIG. 8A is a phase profile of a second thin lens.

FIG. 8A is a phase profile of the second thin lens 130.

Referring to FIG. 8A, a phase shift of light incident on the second thin lens 130 may decrease from a central area of the second thin lens 130 to a peripheral area of the second thin lens 130. When the second thin lens 130 is configured such that the phase profile shown in FIG. 8A is satisfied, the second thin lens 130 may function as a lens with positive refractive power. Also, spherical aberration that occurs in general optical lenses may be decreased. The phase profile of the second thin lens 130 shown in FIG. 8A is merely exemplary, and exemplary embodiments are not limited thereto. For example, a shape of the phase profile may be changed according to a diameter, a focal length, etc. of the second thin lens 130 changes.

Design conditions of the plurality of second scatterers 132 in the second thin lens 130 may be modified according to the phase profile of the second thin lens 130. For example, at least one of the shapes, the sizes, the materials, and the arrangement pattern of the plurality of second scatterers 132 may be modified according to an arranged location of the plurality of second scatterers 132 on the surface of the substrate 110. The shapes, the sizes, the materials, and the arrangement pattern of the plurality of second scatterers 132 may be determined according to an amount of unwrapped phase shift of light that passes through the plurality of second scatterers 132. The amount of unwrapped phase shift indicates a phase component corresponding to a phase shift value between 0 and $2\pi$ remaining after subtracting an integer multiple of $2\pi$ from an amount of phase shift. Respective structures and materials of the plurality of first and the plurality of second scatterers 122 and 132 may vary according to the amount of unwrapped phase shift of light that passes through the plurality of first and the plurality of second scatterers 122 and 132.

Figure 8B:
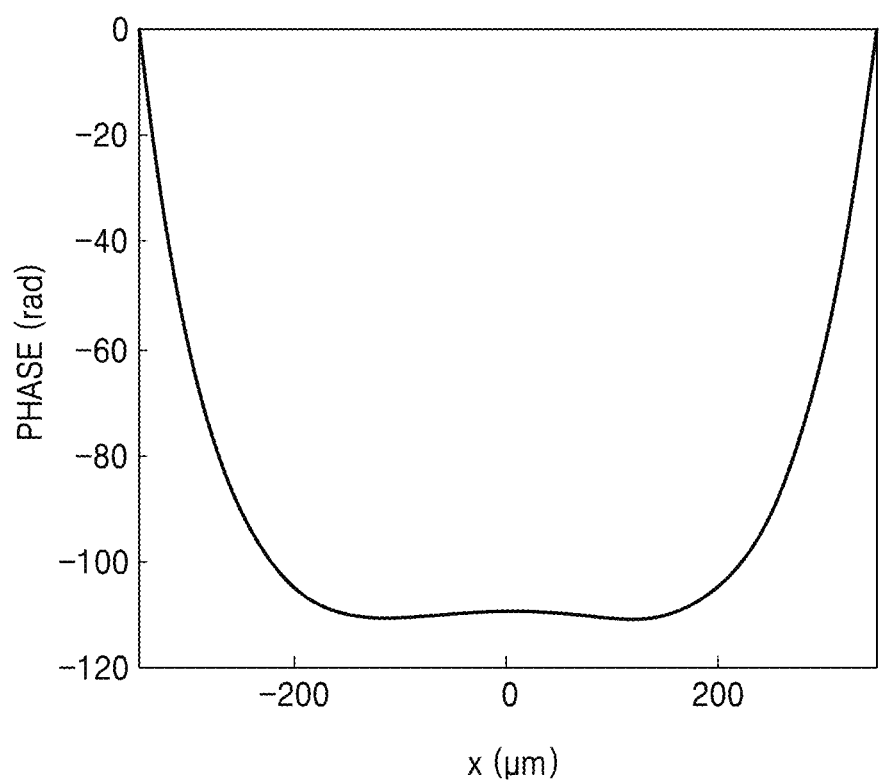
FIG. 8B is a diagram of a phase profile of a first thin lens.

FIG. 8B is a diagram of a phase profile of the first thin lens 120.

Referring to FIG. 8B, a phase shift of light incident on the first thin lens 120 may decrease from a peripheral area of the first thin lens 120 to a middle area of the first thin lens 120 and then increase again from the middle area of the first thin lens 120 to a central area of the first thin lens 120. For example, as shown in FIG. 8B, the first thin lens 120 may have a phase profile in which the phase shift of the incident light decreases from the central area to a middle area having a diameter of approximately 150 μm and increases from the middle area to the peripheral area. When the first thin lens 120 is configured such that the phase profile shown in FIG. 8B is satisfied, the first thin lens 120 may change a path of the incident light and thus correct coma aberration of the second thin lens 130. The phase profile of the first thin lens 120 shown in FIG. 8B is merely exemplary, and exemplary embodiments are not limited thereto. For example, a specific shape of the phase profile of the first thin lens 120 may be changed according to a diameter, a focal length, etc. of the first thin lens 120. Also, the specific shape of the phase profile of the first thin lens 120 may be changed according to the phase profile of the second thin lens 130 and the thickness of the substrate 110.

Figure 9:
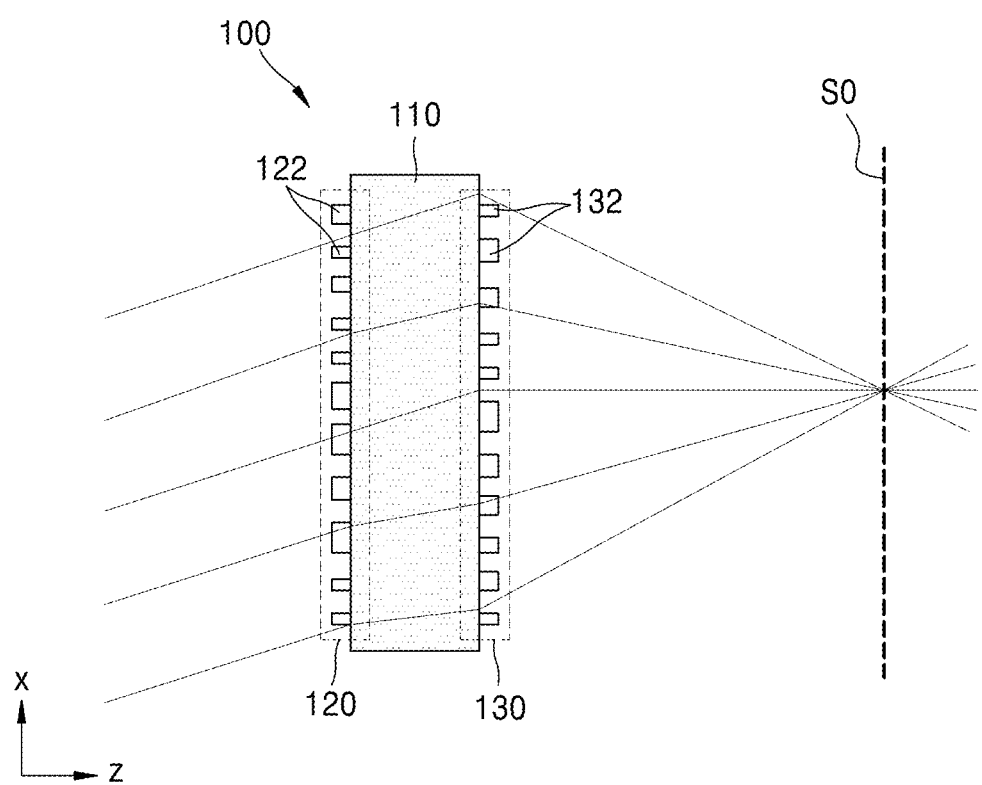
FIG. 9 is an exemplary diagram of a path of light incident on the focusing device of FIG. 5.

FIG. 9 is an exemplary diagram of a path of light incident on the focusing device 100 of FIG. 5.

Referring to FIG. 9, light may be incident on the focusing device 100 in a direction that is not parallel to the optical axis (z-axis) of the focusing device 100. A path of light incident on the first thin lens 120 may be changed by the plurality of first scatterers 122. After the path is changed by the plurality of first scatterers 122, the light may pass through the substrate 110, and the path of the light may be changed again by the plurality of second scatterers 132. The first and second thin lenses 120 and 130 may correct coma aberration of one another. Also, the first and second thin lenses 120 and 130 may allow the light to form a focusing point on the focal plane S0 regardless of angles at which light is incident on the first surface S1 of the substrate 110.

Figure 10A:
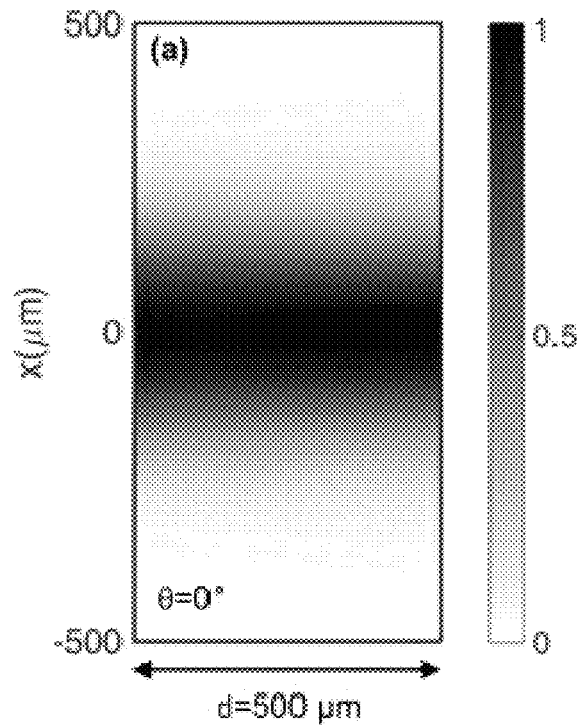
FIGS. 10A and 10B are diagrams of light intensity distribution in a substrate in the focusing device of FIG. 5.
Figure 10B:
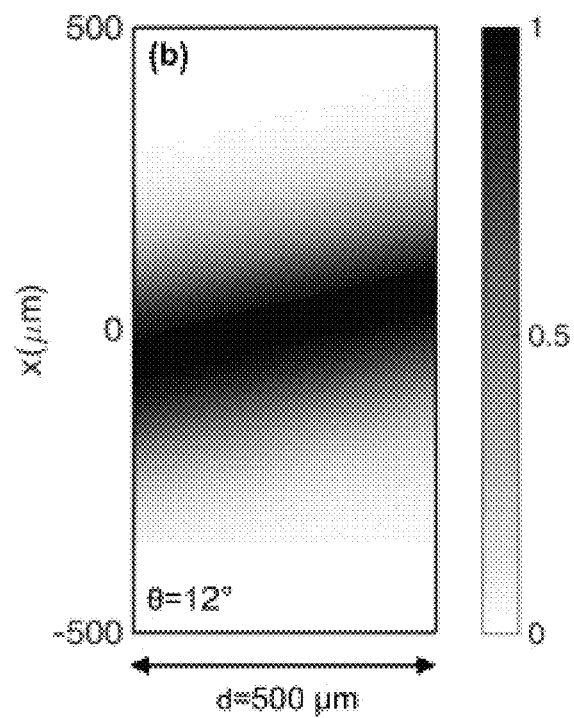

FIGS. 10A and 10B are diagrams of light intensity distribution inside the substrate 110 in the focusing device 100 of FIG. 5.

FIG. 10A shows an example in which light is incident in a direction parallel to an optical axis of the focusing device 100, and FIG. 10B shows an example in which light is obliquely incident (at an incident angle of 12°) with respect to the optical axis of the focusing device 100. Referring to FIGS. 10A and 10B, light intensity distribution in the substrate 110 may vary according to an incident angle of light because the plurality of first scatterers 122 change a path of light that proceeds into the substrate 110. Also, coma aberration of the focusing device 100 may be corrected by changing the light intensity distribution in the substrate 110.

FIGS. 11A to 11F are diagrams of light intensity distribution of an image formed on the focal plane S0 by the focusing device 100 of FIG. 5.

Figure 11A:
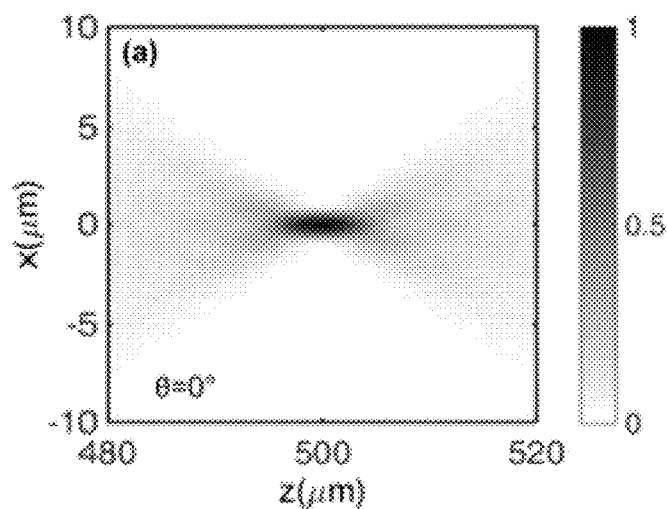
FIGS. 11A to 11F are diagrams of light intensity distribution of an image formed on a focal plane by the focusing device of FIG. 5.
Figure 11B:
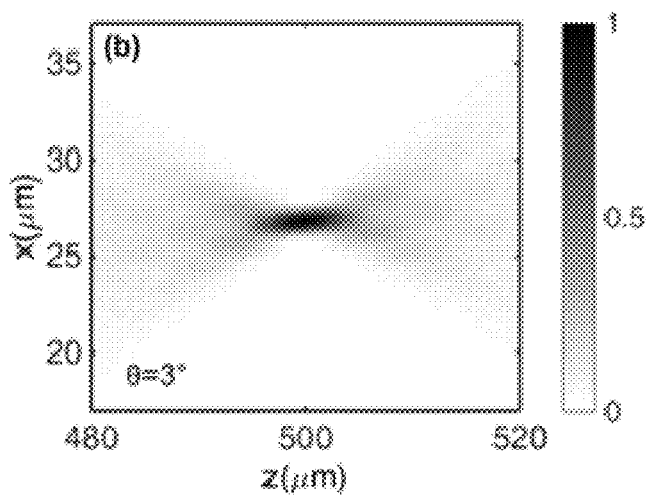
Figure 11C:
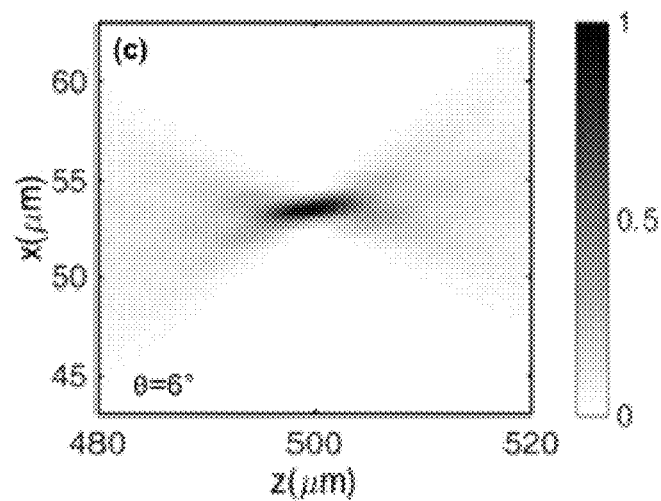
Figure 11D:
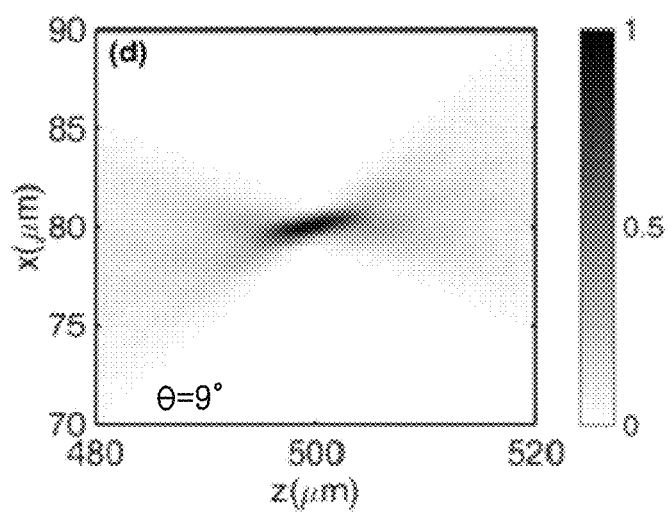
Figure 11E:
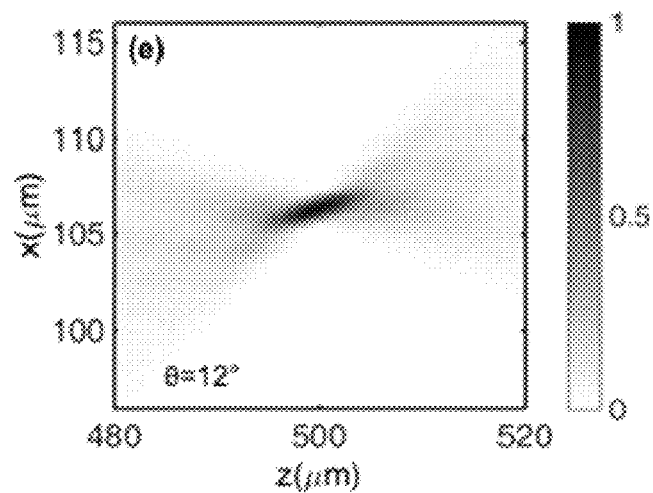
Figure 11F:
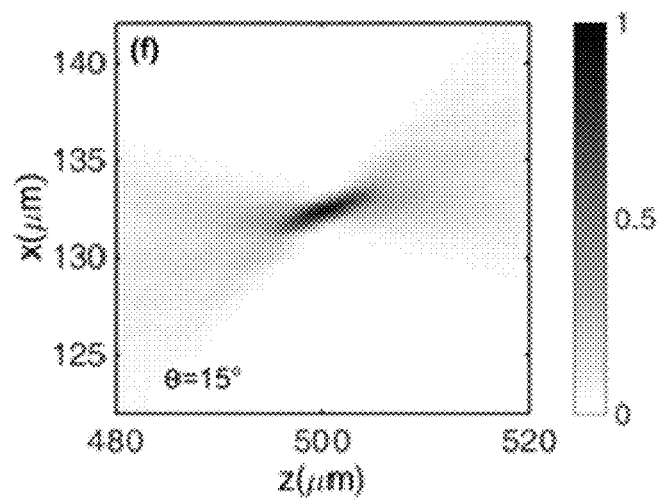

FIG. 11A shows light intensity distribution of an image formed by light incident in parallel to an optical axis of the focusing device 100. FIG. 11B shows light intensity distribution of an image formed by light incident at an incident angle of 3°. FIG. 11C shows light intensity distribution of an image formed by light incident at an incident angle of 6°. FIG. 11D shows light intensity distribution of an image formed by light incident at an incident angle of 9°. FIG. 11E shows light intensity distribution of an image formed by light incident at an incident angle of 12°. FIG. 11F shows light intensity distribution of an image formed by light incident at an incident angle of 15°. Bars at a right hand side of FIGS. 11A to 11F indicates intensity of light.

Referring to FIGS. 11A to 11F, a location of a focusing point may change as an incident angle of light changes from 0° to 15°. However, a shape of light intensity distribution may nearly not change at the location of the focusing point. By using the focusing device 100 of FIG. 5, intensity of light at the focusing point may be almost maintained at a steady rate even when the incident angle of light changes. Also, unlike FIGS. 3A to 3C, the focusing device 100 of FIG. 5 may prevent defocusing even when the incident angle of light increases.

Figure 12:
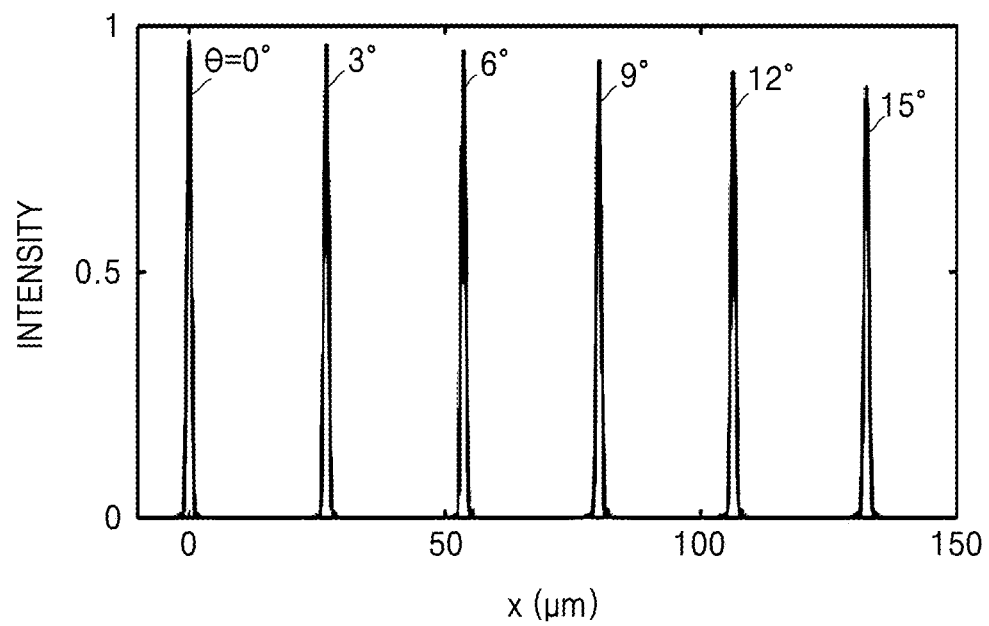
FIG. 12 is a graph of light intensity distribution of an image formed on a focal plane by the focusing device of FIG. 5.

FIG. 12 is a graph of light intensity distribution of an image formed on the focal plane S0 by the focusing device 100 of FIG. 5.

Referring to FIG. 12, a location of a focusing point may change as an incident angle changes from 0° to 15°. However, a shape and a peak of light intensity distribution graph may almost not change at the location of the focusing point. Also, unlike FIGS. 4A and 4B, the graph may show only one peak instead of a plurality of peaks even when the incident angle of light increases. As shown in FIG. 12, coma aberration of the focusing device 100 may be corrected. Therefore, even when the incident angle of light changes, the shape of the light intensity distribution may almost not change at the focusing point. Also, the focusing device 100 may have a wide FOV.

Figure 13:
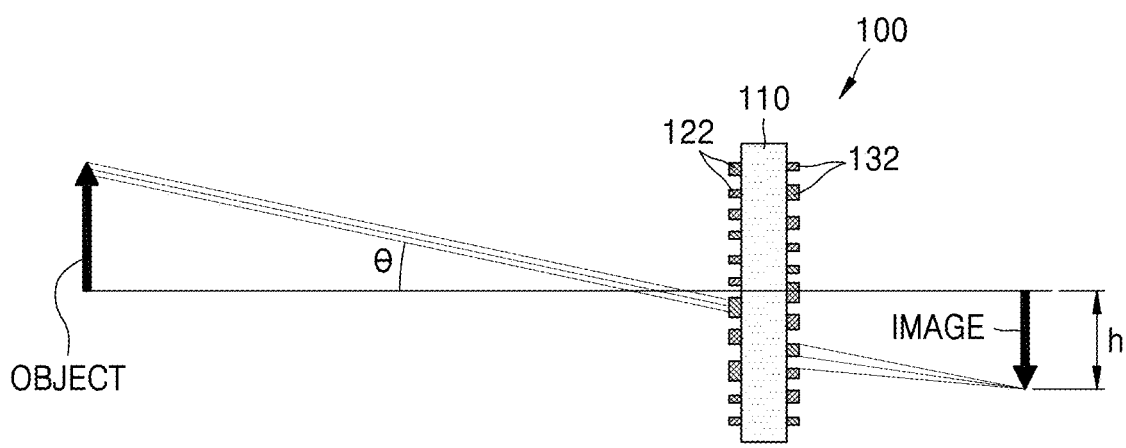
FIG. 13 is an exemplary diagram of forming an image of an object by a focusing device.

FIG. 13 is an exemplary diagram of forming an image of an object by the focusing device 100.

For convenience, the focusing device 100 and an image are enlarged in FIG. 13 and are not drawn to scale. However, an actual distance between an object and the focusing device 100 and a size of the object may be substantially different from a height of the focusing device 100. Therefore, when light reflected from a point of the object is incident on the focusing device 100, the light may be substantially parallel rays. Referring to FIG. 13, a distance h between a location of a focusing point and an optical axis of the focusing device 100 may vary according to an angle θ at which light is incident. For example, when the focusing device 100 is designed such that image distortion is not created, the distance h between the location of the focusing point and the optical axis of the focusing device 100 may satisfy Equation 1.

$$h = f^* \tan \theta \quad \text{[Equation 1]}$$

In Equation 1, 'h' is the distance between the location of the focusing point and the optical axis of the focusing device 100, 'f' is an effective focal length of the focusing device 100, and 'θ' is an incident angle of light.

As another example, when the focusing device 100 is provided as an orthographic fisheye lens to enlarge the FOV of the focusing device 100, the distance h between the location of the focusing point and the optical axis of the focusing device 100 may satisfy Equation 2

$$h = f^* \sin \theta \quad \text{[Equation 2]}$$

In Equation 2, 'h' is the distance h between the location of the focusing point and the optical axis of the focusing device 100, 'f' is an effective focal length of the focusing device 100, and 'θ' is an incident angle of light.

Figure 14:
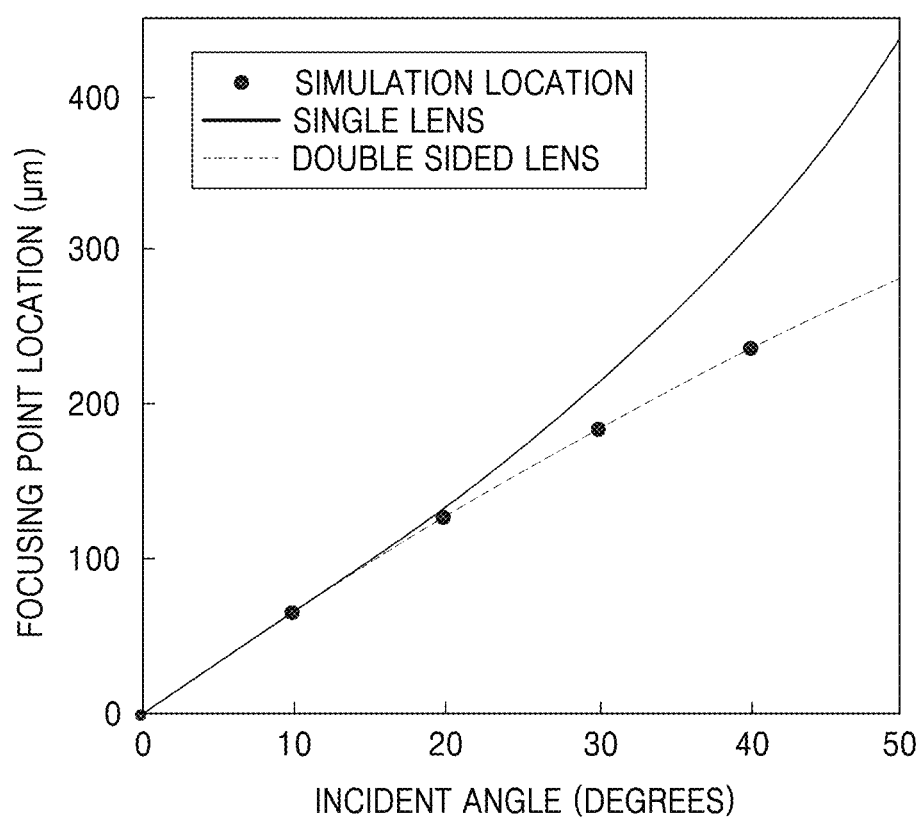
FIG. 14 is a graph of a relationship between locations of focusing points and incident angles of light.

FIG. 14 is a graph of a relationship between locations of focusing points and incident angles of light.

In FIG. 14, a solid line indicates the focusing device 100 forming a distortion free image, and a dashed line indicates the focusing device 100 provided as an orthographic fisheye lens. A location at which an image is formed according to incident angles of light may be changed by modifying designs of the plurality of first and the plurality of second scatterers 122 and 132. Accordingly, an image distortion degree and the FOV of the focusing device 100 may be adjusted. For example, when image accuracy is required, an image formed by light that passed through the focusing device 100 may be determined according to the solid line of FIG. 14. As another example, a wide FOV is required, an image formed by light that passed through the focusing device 100 may be determined according to the dashed line of FIG. 14.

The focusing device 100 of FIG. 5 may focus incident light according to wavelengths of incident light.

The first and second thin lenses 120 and 130 may differently change a direction of incident light according to wavelengths of the incident light. Therefore, the focusing device 100 according to an exemplary embodiment may only allow incident light within a certain wavelength band to form a focusing point on the focal plane S0. Also, the first and second thin lenses 120 and 130 may differently correct coma aberration according to the wavelengths of the incident light. A wavelength of light that is allowed by the focusing device 100 to form the focusing point on the focal plane S0 is a design wavelength of the focusing device 100. Design conditions of the plurality of first and the plurality of second scatterers 122 and 132 may vary according to the wavelength of light that is to be focused by the focusing device 100, i.e., the design wavelength of the focusing device 100.

Figure 15:
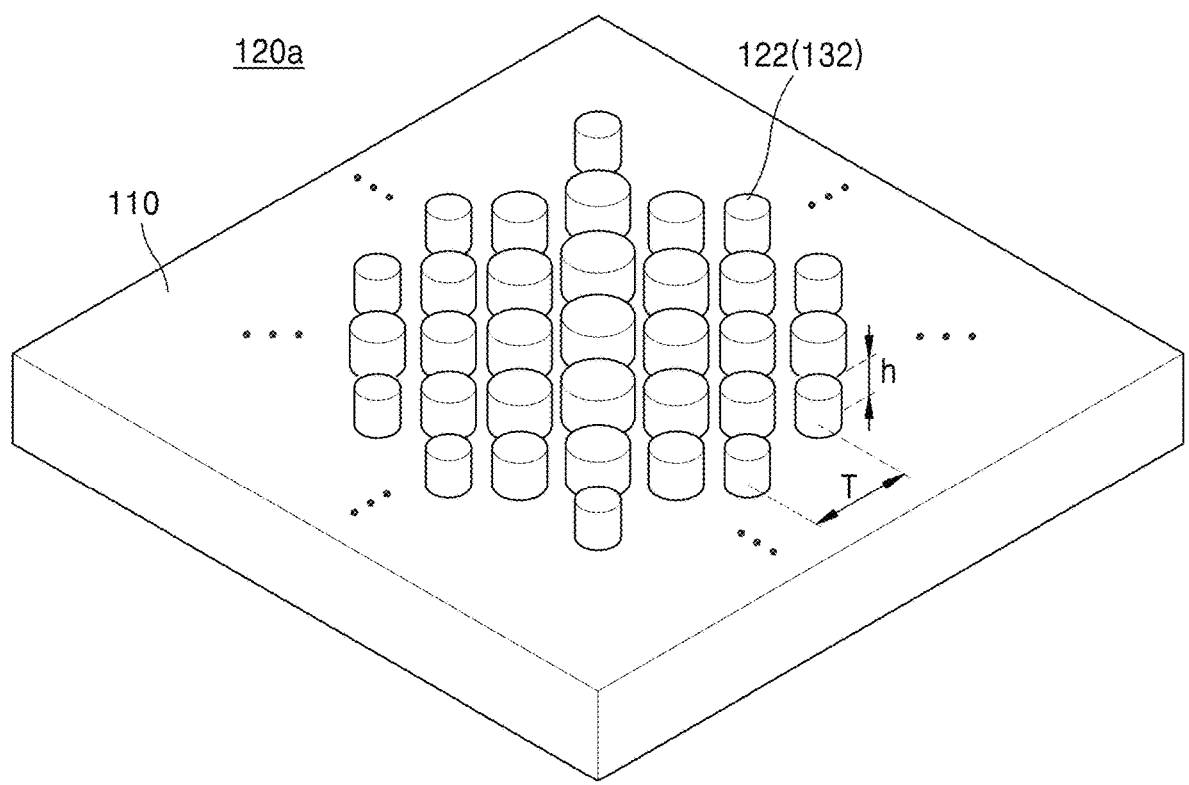
FIG. 15 is an exemplary diagram of an arrangement of first and second scatterers.

FIG. 15 is an exemplary diagram of an arrangement of the plurality of first and the plurality of second scatterers 122 and 132.

Referring to FIG. 15, intervals T between the plurality of first and the plurality of second scatterers 122 and 132, respective heights h of the plurality of first and the plurality of second scatterers 122 and 132, and an arrangement pattern of the plurality of first and the plurality of second scatterers 122 and 132 may be determined according to the design wavelength of the focusing device 100. The intervals T between the plurality of first and the plurality of second scatterers 122 and 132 may be less than the design wavelength. For example, the intervals between the plurality of first and the plurality of second scatterers 122 and 132 may be equal to or less than ¾ or ⅔ of the design wavelength. Also, the respective heights h of the plurality of first and the plurality of second scatterers 122 and 132 may be less than the design wavelength. For example, the respective heights h of the plurality of first and the plurality of second scatterers 122 and 132 may be equal to or less than ⅔ of the design wavelength.

Figure 16A:
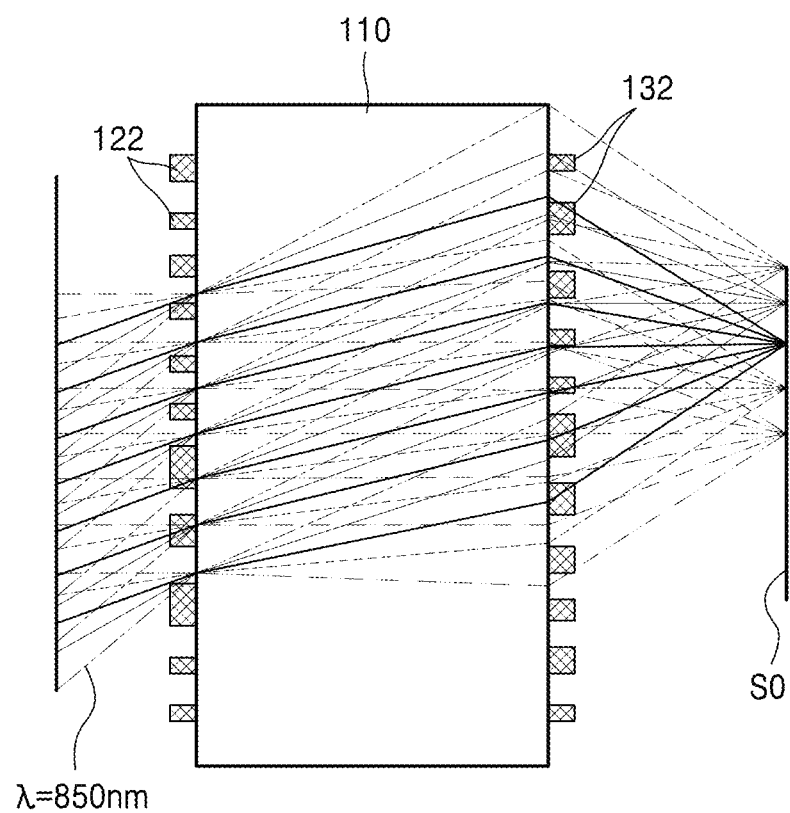
FIGS. 16A to 16C are diagrams for describing changes in paths of incident light according to wavelengths of the incident light.
Figure 16B:
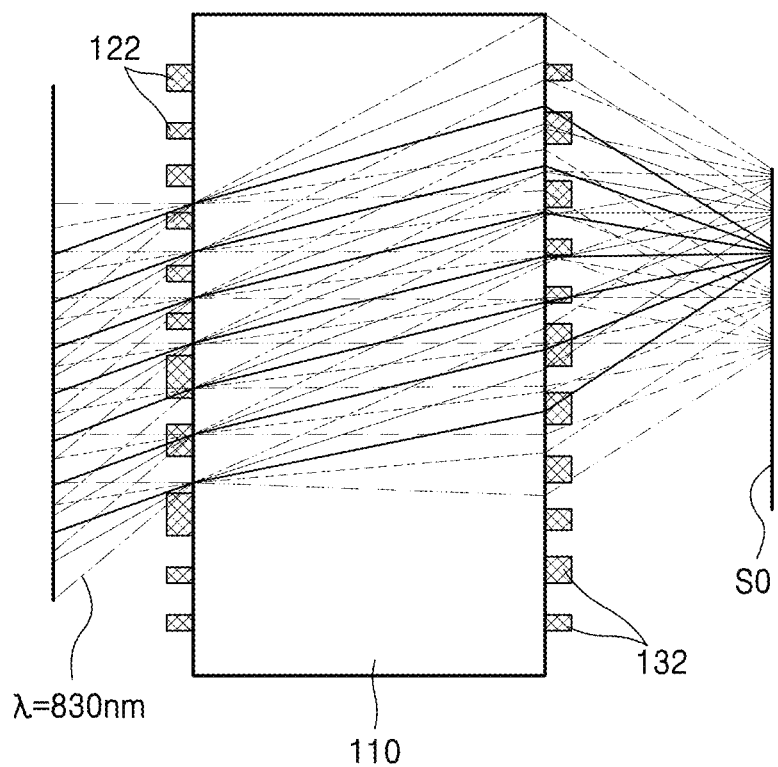
Figure 16C:
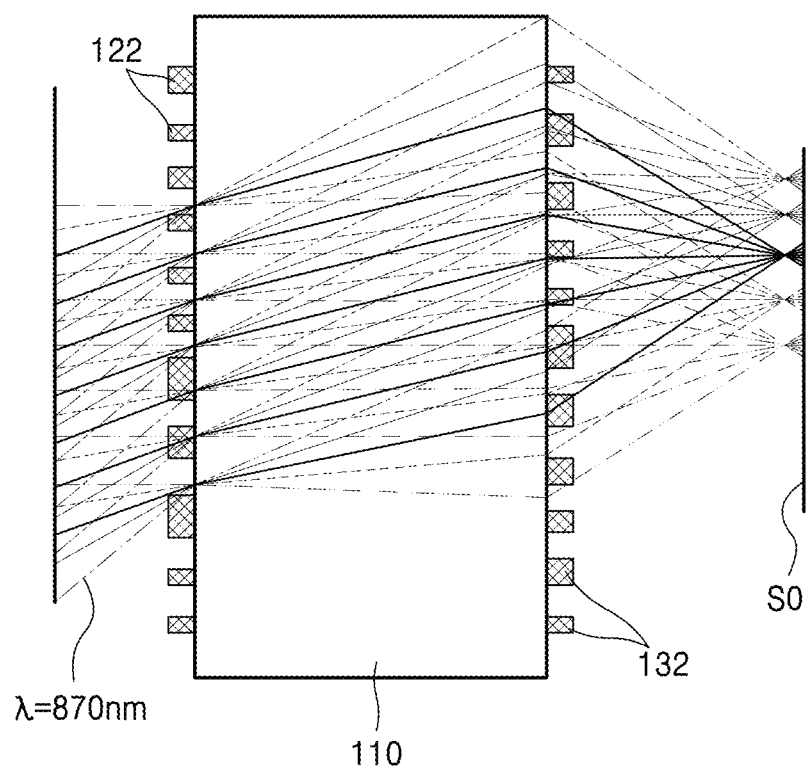

FIGS. 16A to 16C are diagrams for describing changes in path of incident light according to wavelengths of the incident light. The focusing device 100 of FIGS. 16A to 16C are designed to be appropriate for focusing about light having a wavelength of 850 nm.

Referring to FIG. 16A, when light having a wavelength that corresponds to the design wavelength of the focusing device 100 is incident, a focusing point of the light may be formed on the focal plane S0 regardless of an incident angle of the light. However, referring to FIG. 16B, when light having a wavelength (830 nm) that is less than the design wavelength is incident, the light may reach the focal plane S0 before a focusing point of the light is formed. Also, referring to FIG. 16C, when light having a wavelength (870 nm) that is greater than the design wavelength is incident, a focusing point may be formed before the light reaches the focal plane S0.

Figure 17A:
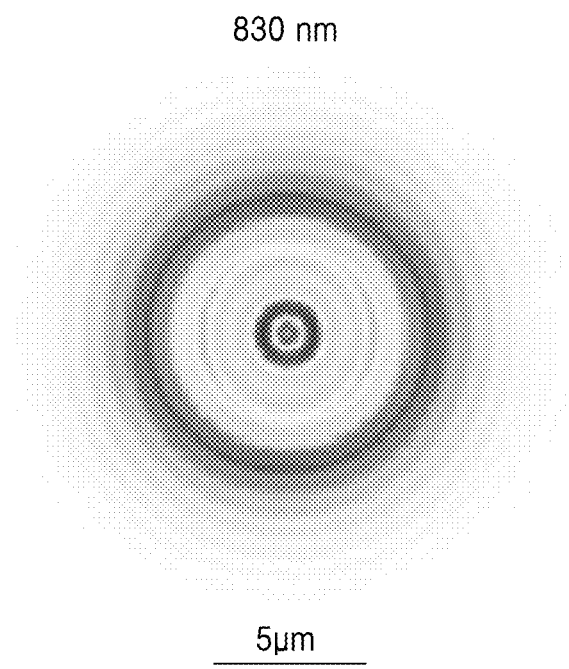
FIGS. 17A to 17C are diagrams of light intensity distribution of an image formed on a focal plane by light incident in parallel to an optical axis of a focusing device.
Figure 17B:
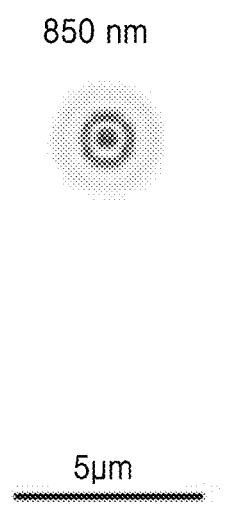
Figure 17C:
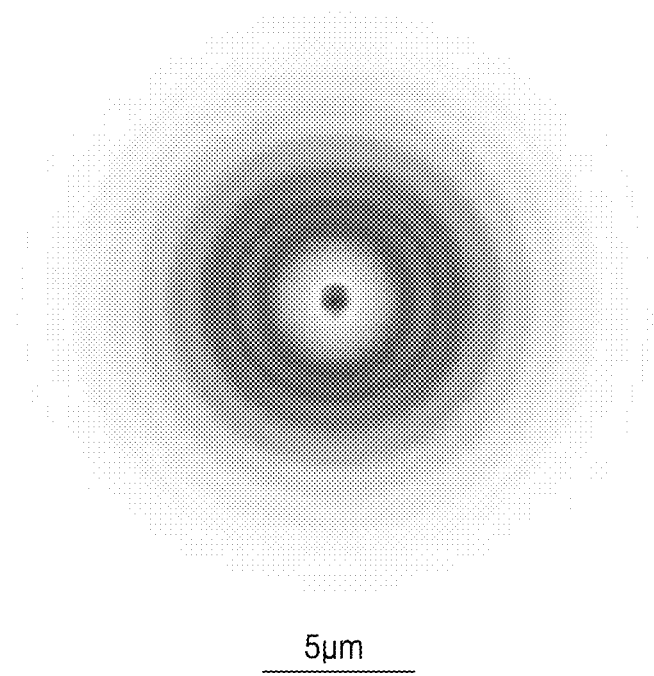

FIGS. 17A to 17C are diagrams of light intensity distribution of an image formed on the focal plane S0 by light incident in parallel to an optical axis of the focusing device 100.

Referring to FIG. 17B, an image formed by light having a wavelength (850 nm) corresponding to the design wavelength of the focusing device 100 may have narrow light intensity distribution. However, referring to FIGS. 17A and 17C, an image formed by light having a wavelength (830 nm or 870 nm) different from the design wavelength of the focusing device 100 may have wide light intensity distribution. That is, when the wavelength of incident light is different from the design wavelength of the focusing device 100, a focusing effect of the light incident in parallel to the optical axis of the focusing device 100 may decrease.

Figure 18:
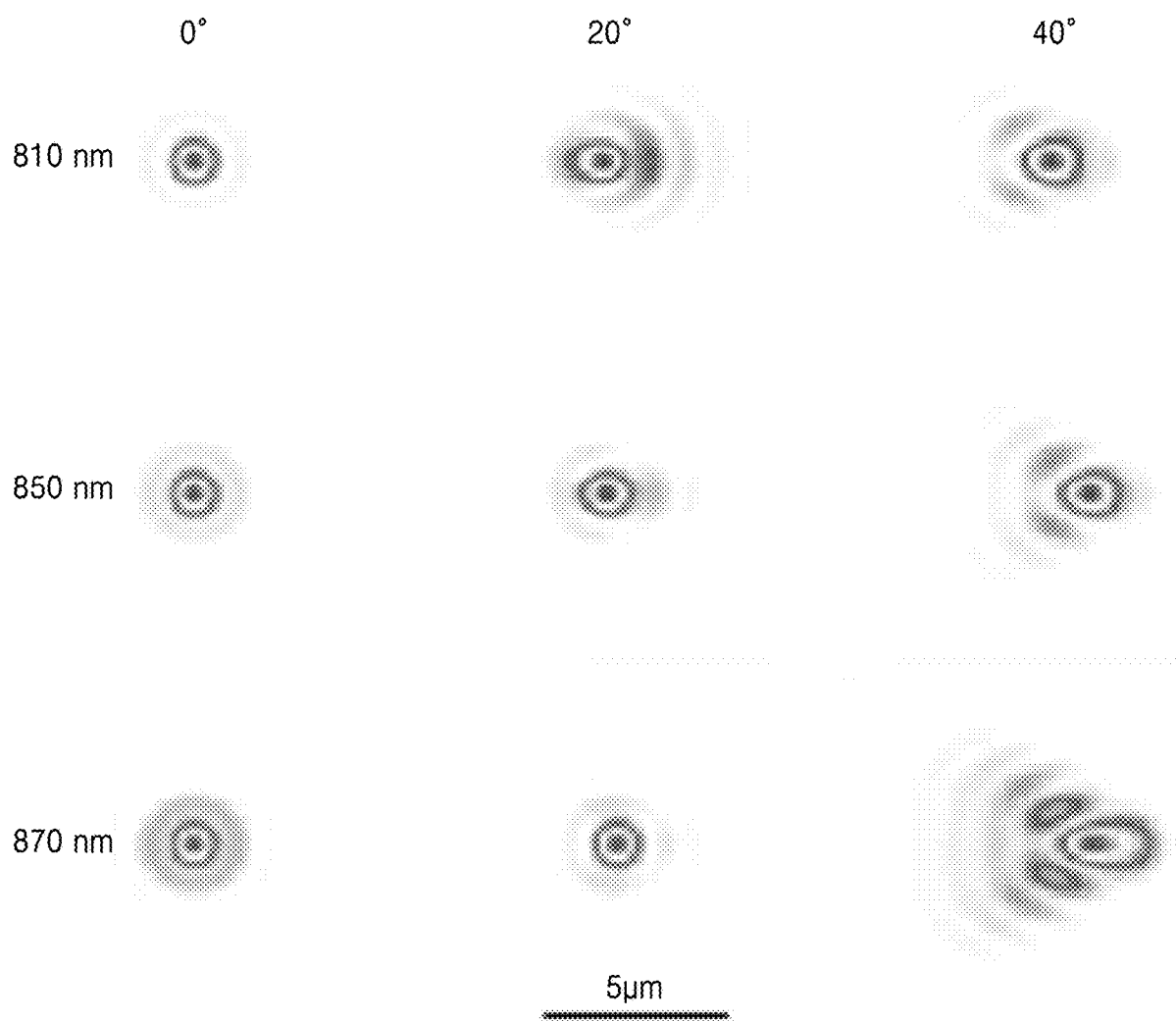
FIG. 18 is a diagram of changes in light intensity distribution of an image according to wavelengths and incident angles of incident light.

FIG. 18 is a diagram of changes in light intensity distribution of an image according to wavelengths and incident angles of incident light.

Referring to FIG. 18, when a wavelength of incident light corresponds to a design wavelength (850 nm), a focusing effect may not decrease until an incident angle reaches 20°. Also, when the incident angle is equal to 40°, light intensity distribution may change by a minor degree. However, when light has a wavelength of 810 nm, there may be a significant change in light intensity distribution as an incident angle changes to 20°. Also, when light has a wavelength of 870 nm, there may be a significant change in light intensity distribution as an incident angle changes to 40°. That is, when the wavelength of incident light is different from the design wavelength of the focusing device 100, the focusing device 100 may be less effective in correcting coma aberration.

Figure 19:
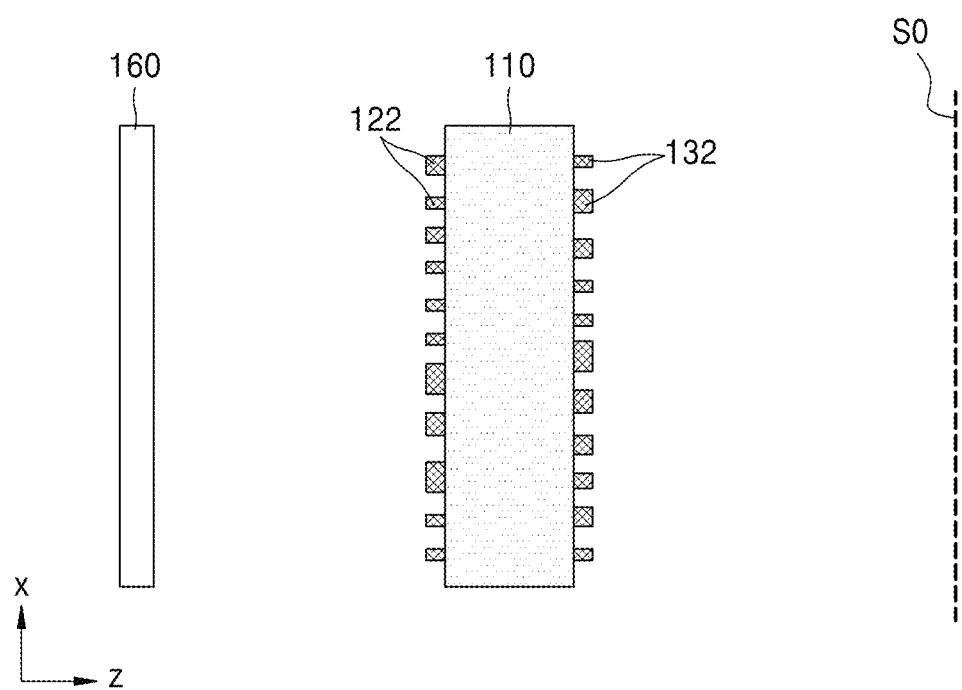
FIG. 19 is a diagram of a focusing device according to another exemplary embodiment.

FIG. 19 is a diagram of a focusing device 100 according to another exemplary embodiment.

Referring to FIG. 19, the focusing device 100 may include an optical filter 160 that blocks wavelengths of the incident light which are different from the design wavelength of the focusing device 100. The optical filter 160 may transmit light having a wavelength equal or similar to the design wavelength of the focusing device 100 from the incident light. Also, the optical filter 160 may reflect or absorb light having a wavelength that is not similar to the design wavelength. The optical filter 160 may filter the wavelength of incident light and thus prevent a light component with a weak focusing effect from reaching a focal plane S0.

Figure 20:
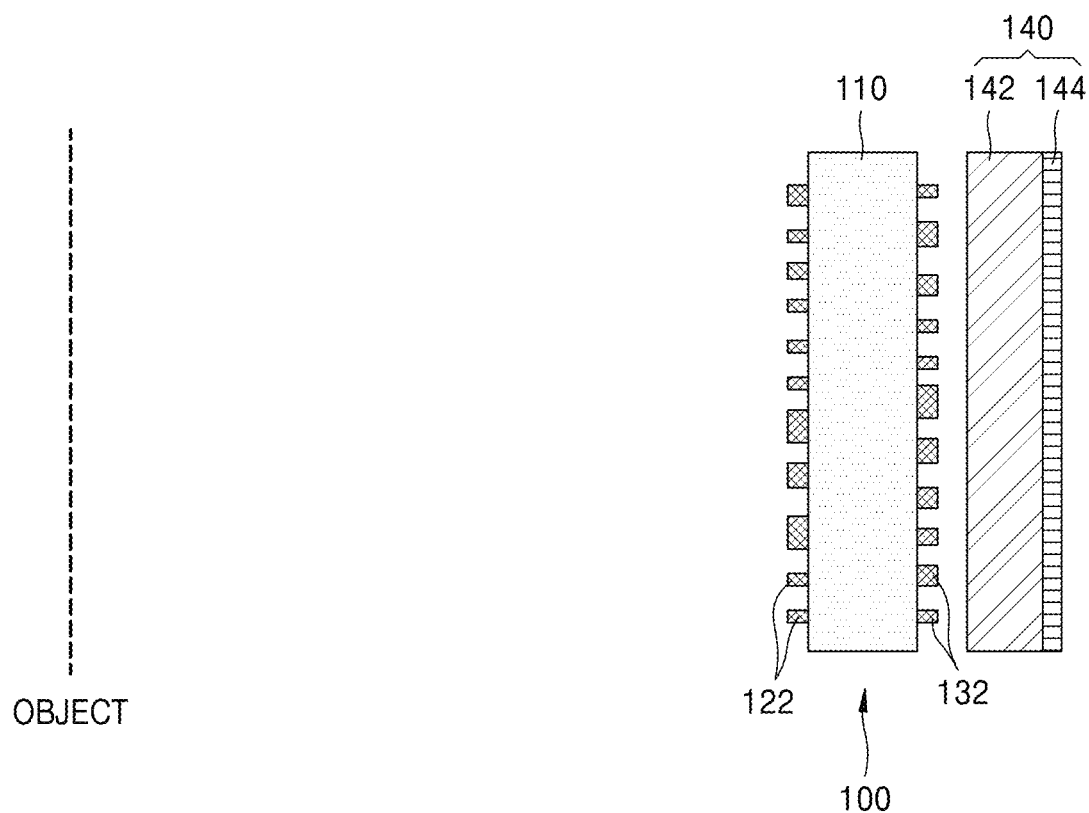
FIG. 20 is an imaging device according to another exemplary embodiment.

FIG. 20 is an imaging device according to another exemplary embodiment.

Referring to FIG. 20, the imaging device may include the focusing device 100 of FIG. 5, and an optical detector 140 that detects light that passed through the focusing device 100. The optical detector 140 may include an optical detection layer 144 provided at the focal plane S0 of the focusing device 100 and a cover glass 142 that protects the optical detection layer 144 and the optical detection layer 144. The optical detection layer 144 may include a plurality of charge-coupled devices (CCDs), complementary metal-oxide semiconductor (CMOS) sensors, photo diodes, etc. The optical detection layer 144 may convert optical signals incident on the optical detection layer 144 into electric signals.

Figure 21:
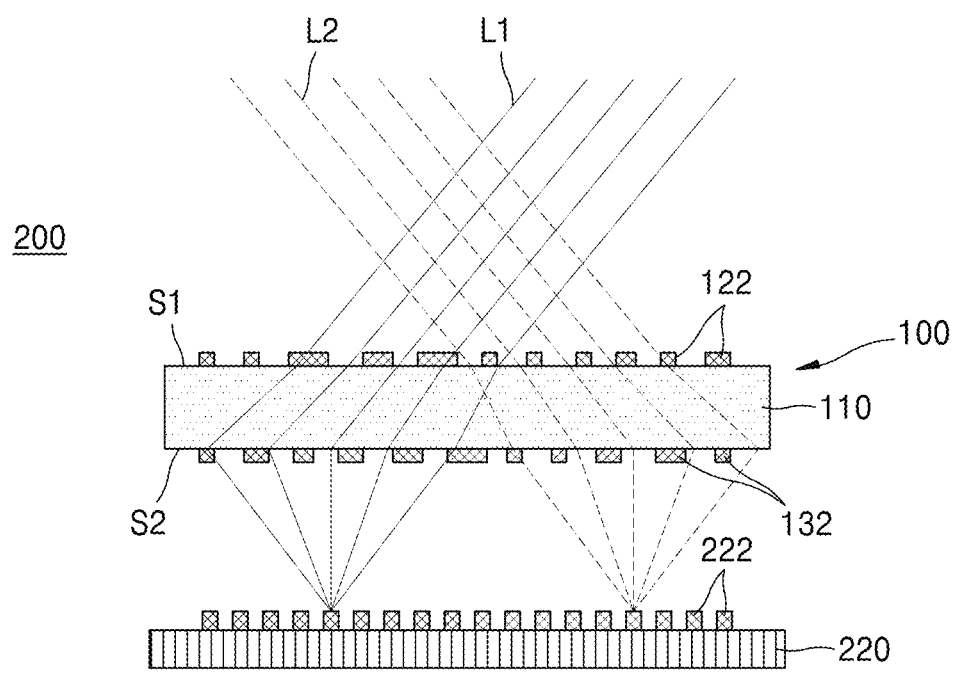
FIG. 21 is a diagram of a beam scanner according to an exemplary embodiment.

FIG. 21 is a diagram of a beam scanner 200 according to an exemplary embodiment.

Referring to FIG. 21, the beam scanner 200 may include the focusing device 100 of FIG. 5. Also, the beam scanner 200 may include a light source array 220 that includes a plurality of light sources 222. The light source array 220 may be provided at a location of the focal plane S0 of the focusing device 100 of FIG. 5. Therefore, a distance between the light source array 220 and the focusing device 100 may vary according to an effective focal length of the focusing device 100.

The focusing device 100 may focus incident light to another location according to an incident angle of the light incident on the first surface S1 of the substrate 110. Similarly, a path of light that passed through the focusing device 100 may change depending on respective locations of the plurality of light sources 222 emitting light from the light source array 220 facing the second surface S2 of the substrate 110. For example, as shown in FIG. 21, paths of light rays L1 and light rays L2 that passed through the focusing device 100 may change according to the respective locations of the plurality of light sources 222 emitting light. Also, the light rays L1 and L2 that passed through the focusing device 100 may be parallel rays. Therefore, the focusing device 100 may function as an optical path modifier of the beam scanner 200.

Since the first and second thin lenses 120 and 130 are designed to correct coma aberration of each other, the focusing device 100 may have a wide FOV. Accordingly, an area of the light source array 220 may be less limited. Also, the light source array 220 may adjust the respective locations of the plurality of light sources 222 and thus easily adjust direction of light emitted by the beam scanner 200.

Figure 22:
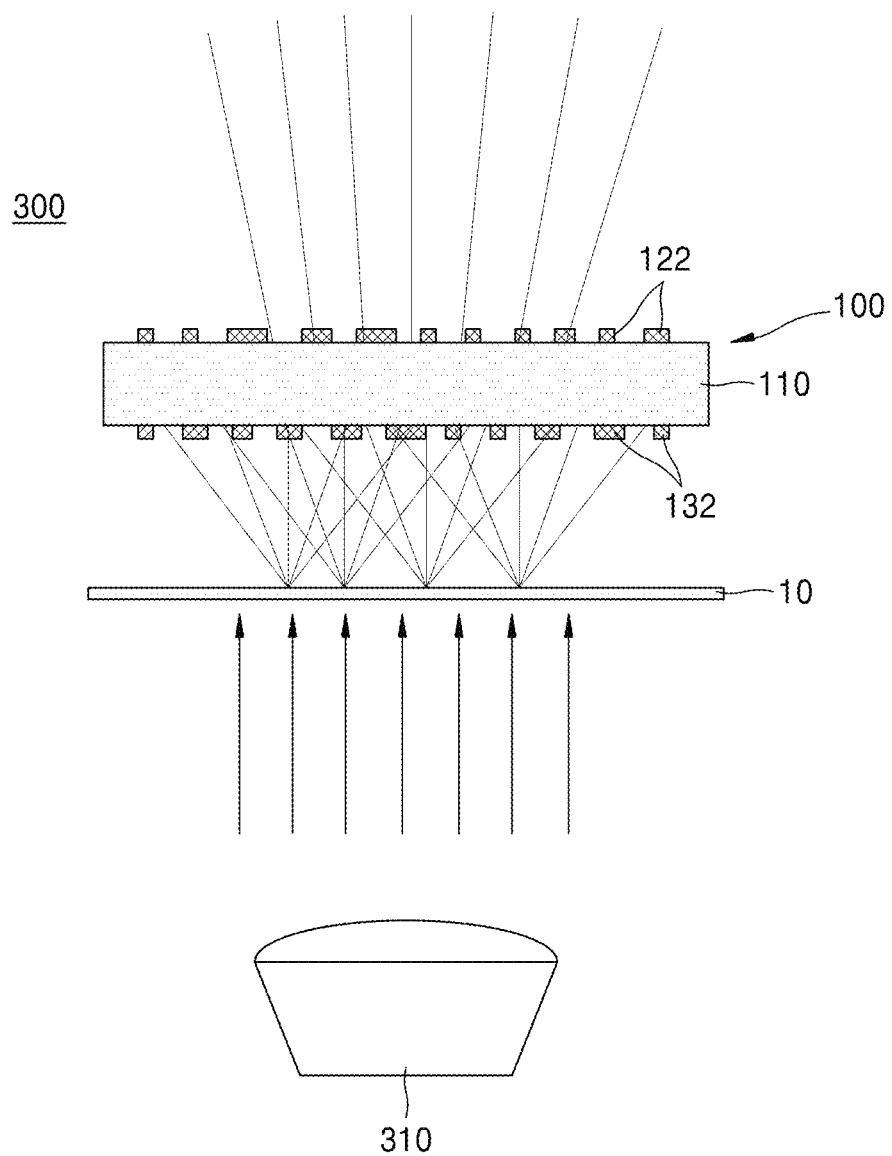
FIG. 22 is a diagram of a scope device according to another exemplary embodiment.

FIG. 22 is a diagram of a scope device 300 according to another exemplary embodiment. Referring to FIG. 22, the scope device 300 may include a focusing device 100, and a light source 310 arranged to face a second surface S2 of a substrate 110 of the focusing device 100 and emitting light on a target object 10. Light emitted from the light source 310 may pass through the target object 10 and be incident on the focusing device 100. Also, since the focusing device 100 may function as a focusing lens, the focusing device 100 may be used as an object lens of the scope device 300. In this case, the scope device 300 refers to a device for observing objects that are small or far away, such as a microscope or a telescope. Since the focusing device 100 has a wide FOV, the scope device 300 may observe a large area of the target object 10 without coma aberration.

Figure 23:
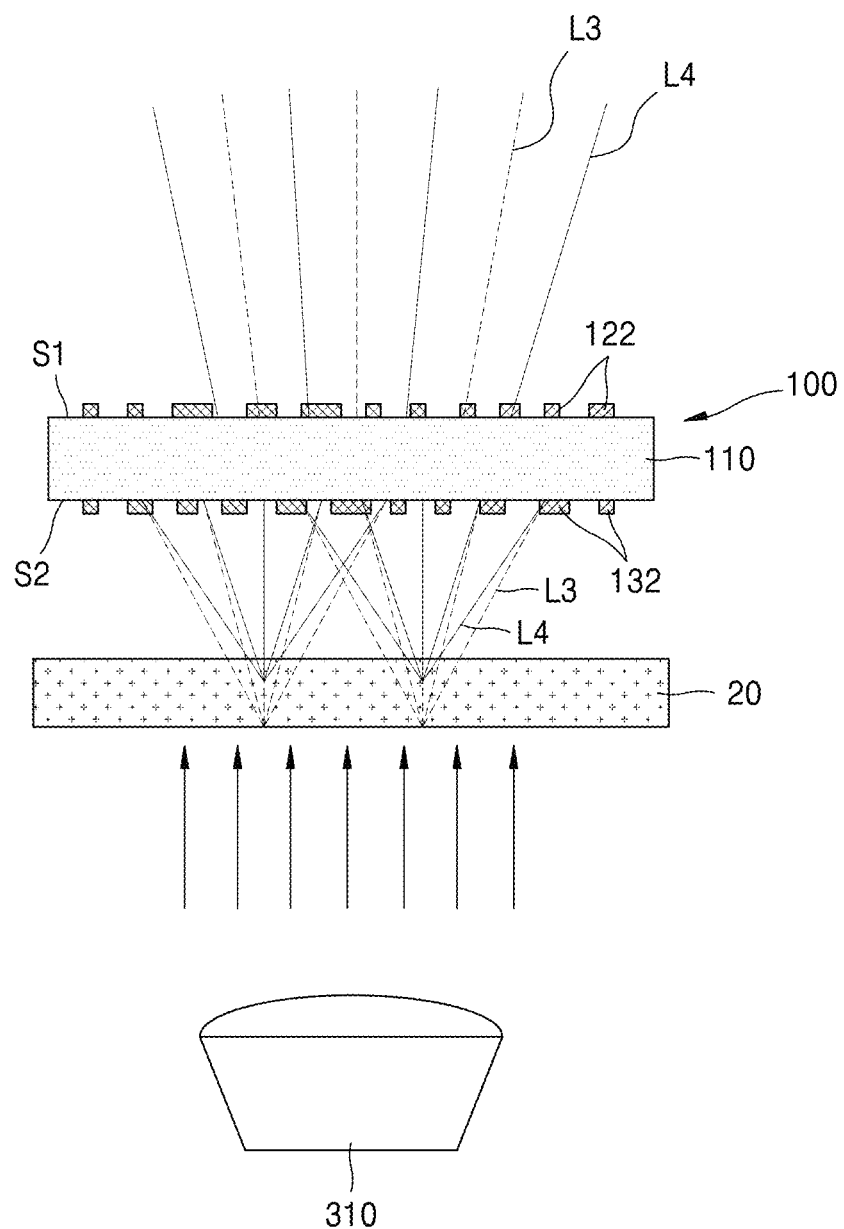
FIG. 23 is an exemplary diagram of observing a target object by using a scope device.

FIG. 23 is an exemplary diagram of 3-dimensional (3D) volumetric imaging a target object 20 by using the scope device 300.

Referring to FIG. 23, when the light source 310 emits light having various wavelengths on the target object 20, the focusing device 100 of the scope device 300 may function as an object lens that has different focal lengths with respect to the target object 20 according to the wavelengths of the light emitted from the light source 310. The light source 310 may emit light having different wavelengths on the target object 20 according to time variation. Alternatively, the light source 310 may simultaneously emit light having different wavelengths on the target object 20. The scope device 300 may divide light that passed through the target object 20 according to its wavelengths and record images of the target object 20. Also, the scope device 300 may analyze the images according to the wavelengths of light, and thus extract a 3D image including depth information of the target object 20.

Examples of focusing devices according to various embodiments are described below. The below-described focusing devices may be applied to various optical devices, for example, the above-described imaging devices, scope devices, or beam scanners.

Figure 24:
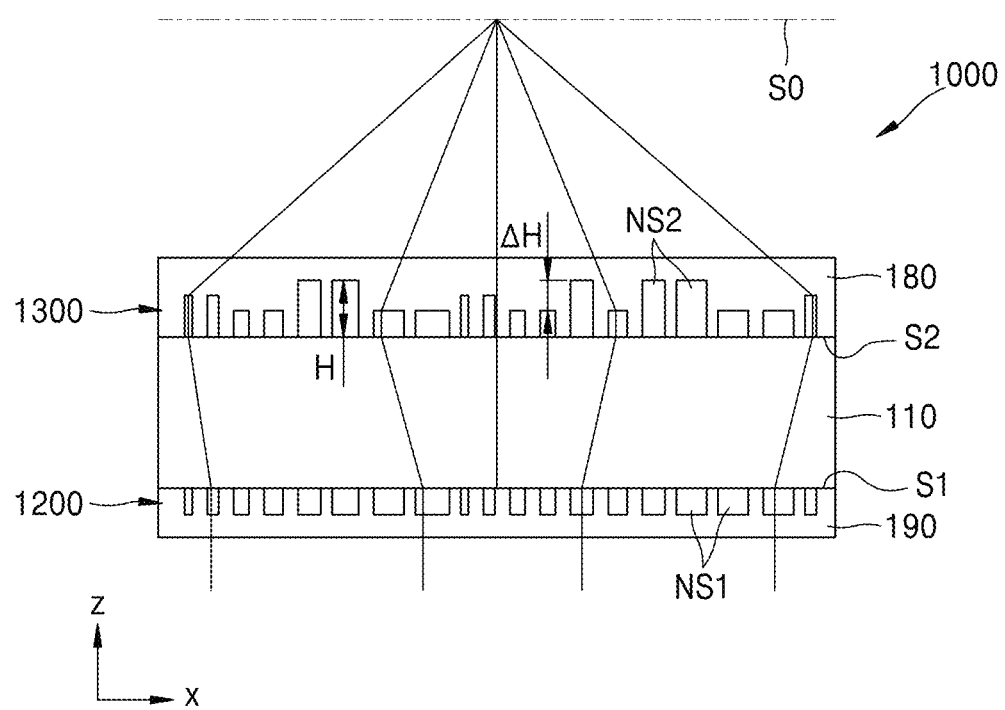
FIG. 24 is a diagram of a focusing device according to another exemplary embodiment.
Figure 25:
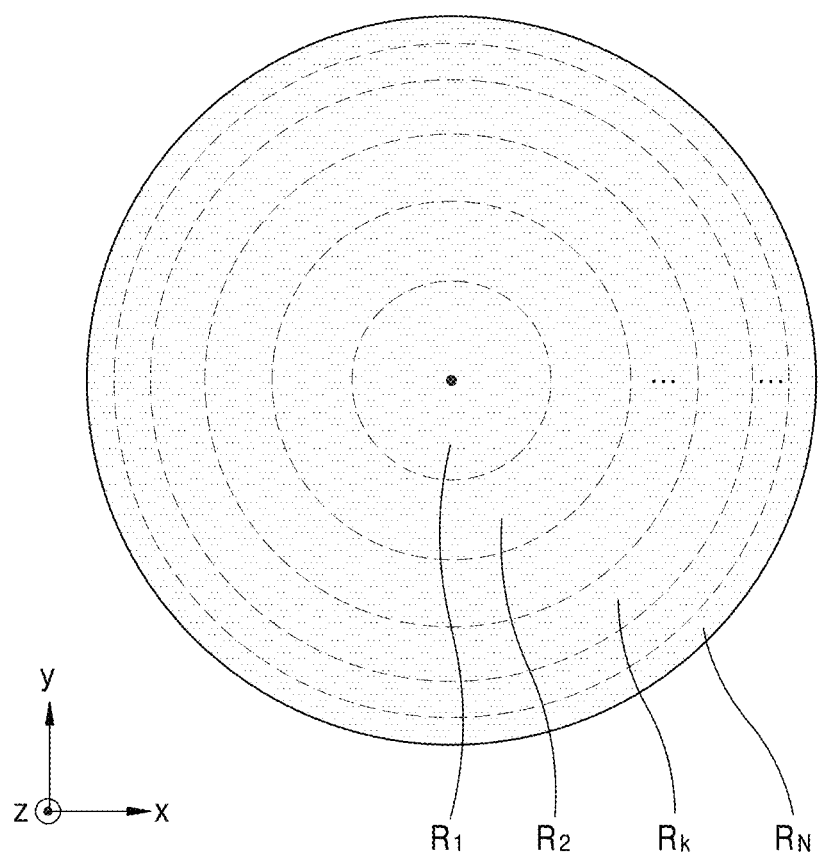
FIG. 25 is an exemplary diagram of classification of regions related to the arrangement of second scatterers provided in a second thin lens of the focusing device of FIG. 24.
Figure 26:
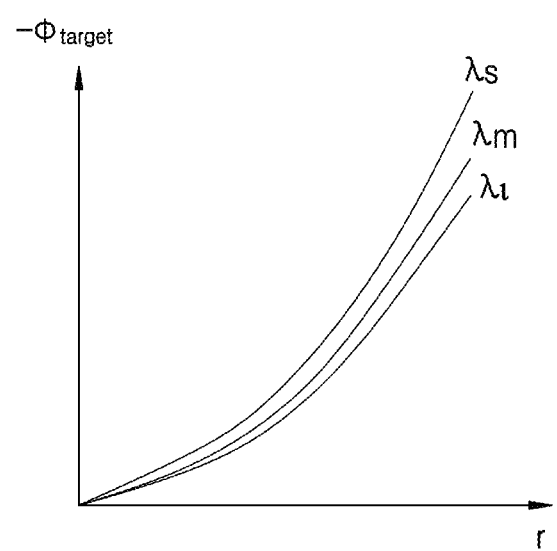
FIG. 26 is a graph conceptually showing a target phase for each wavelength to be satisfied by scatterers in each region of FIG. 25.

FIG. 24 is a diagram of a focusing device 1000 according to another exemplary embodiment. FIG. 25 is an exemplary diagram of classification of regions related to the arrangement of second scatterers provided in a second thin lens 1300 of the focusing device 1000 of FIG. 24. FIG. 26 is a graph conceptually showing a target phase for each wavelength to be satisfied by the scatterers in each region of FIG. 25.

Referring to FIG. 24, the focusing device 1000 for focusing light of a predetermined wavelength band on a predetermined focal plane S0 may include the substrate 110, a first thin lens 1200 including a plurality of first scatterers NS1 formed on a first surface S1 of the substrate 110, and the second thin lens 1300 including a plurality of second scatterers NS2 formed on a second surface S2 of the substrate 110.

Like the above-described embodiments, the first scatterers NS1 of the first thin lens 1200 may be configured to correct geometric aberration of the second thin lens 1300, and the second scatterers NS2 may be configured so that the second thin lens 1300 may function as a lens with positive refractive power.

Furthermore, a low refractive index material layer 190 including a material with a refractive index lower than that of the first scatterers NS1 and covering the first scatterers NS1 may be further provided to protect the first scatterers NS1, and a low refractive index material layer 180 including a material with a refractive index lower than that of the second scatterers NS2 and covering the second scatterers NS2 may be further provided to protect the second scatterers NS2. The low refractive index material layers 180 or 190 may be omitted.

In the present embodiment, at least two of the second scatterers NS2 provided in the second thin lens 1300 may have different heights H from each other. A height difference $\Delta H$ between at least two second scatterers NS2 may be equal to or less than $2\lambda$ with respect to a wavelength $\lambda$ within the predetermined wavelength band. The respective heights H of the second scatterers NS2 may be in a range that $\lambda/2 \leq H \leq 3\lambda$ with respect to the wavelength $\lambda$ within the predetermined wavelength band.

The second scatterers NS2 have different heights from each other to further freely adjust chromatic aberration, that is, dispersion according to wavelengths, when focusing light of a relatively wide wavelength band on the focal plane S0.

In order to have refractive power to incident light, the classification of regions of FIG. 25 may be used for determining the shapes of the second scatterers NS2 and arranging the second scatterers NS2. A predetermined rule regarding the sizes and arrangement of the second scatterers NS2 is applied to each of a plurality of regions $R_1, R_2, \ldots R_k, \ldots R_N$. A target phase $\varphi_{target}$ as illustrated in FIG. 26 may be set to each region. The target phase $\varphi_{target}$ may be set to indicate a phase change range of $2\pi$ with respect to a central wavelength $\lambda_m$ in the region given in FIG. 25, and thus the regions $R_1, R_2, \ldots R_k, \ldots R_N$ may be referred to as the "$2\pi$ zone". In the vertical axis of the graph of FIG. 26, the negative (−) sign is shown as an example of being a phase for indicating positive refractive power.

The target phase $\varphi_{target}$ target may slightly vary according to light of different wavelengths $\lambda_l, \lambda_m,$ and $\lambda_s$, as illustrated in FIG. 26. In order to implement a desired target phase to each light of a determined wavelength, a rule regarding the shape, size, and arrangement of the second scatterers NS2 arranged in a plurality of $2\pi$ zones may be determined. In the following description, an expression "shape distribution" may be used together as an expression meaning the "shape, size, and arrangement". A degree that the target phase $\varphi_{target}$ varies according to light of a different wavelength is related to a dispersion $\Delta\varphi$, and a wavelength range including presented examples $\lambda_l, \lambda_m,$ and $\lambda_s$ is related to a bandwidth BW. A shape condition of each of the second scatterers NS2 which may implement a dispersion $\Delta\varphi$ within a desired range with respect to desired bandwidth BW may be set from a phase-dispersion map prepared in advance. A phase-dispersion map may be generally created by a method of setting the second scatterers NS2 to a certain height and marking a shape condition at a position corresponding to (phase, dispersion) at the central wavelength by various combinations of a width and a pitch. A design dimension that may produce desired performance at a desired position may be selected from the map. When a height variation is introduced, a plurality of phase-dispersion maps having different height conditions from each other may be set to overlap each other, that is, a range of selecting the shape of the second scatterers NS2 may extend. As such, the shape and arrangement of the second scatterers NS2 may be determined so as to freely correct chromatic aberration while increasing a focusing wavelength band.

Although FIG. 24 randomly illustrates the height H, width w, and pitch p of each of the second scatterers NS2, this is merely for convenience of explanation, and the present disclosure is not limited thereto. For example, a predetermined rule may be set and applied not only to the width and pitch but also to the height in the region as illustrated in FIG. 25.

Figure 27:
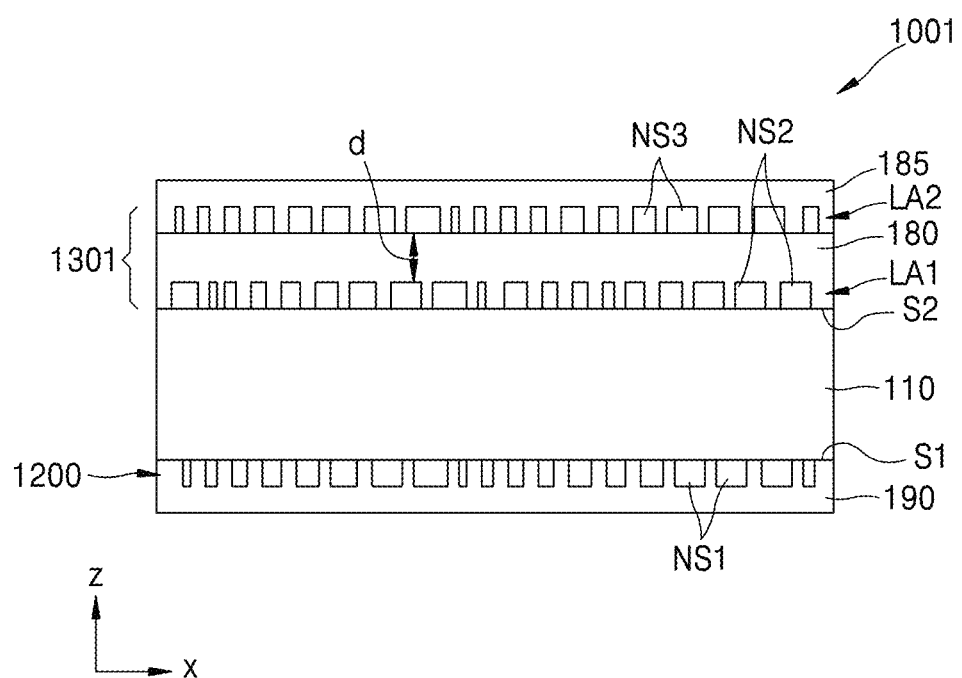
FIG. 27 is a diagram of a focusing device according to another exemplary embodiment.

FIG. 27 is a diagram of a focusing device 1001 according to another exemplary embodiment.

Referring to FIG. 27, the focusing device 1001 may include the substrate 110, the first thin lens 1200 including the first scatterers NS1 formed on the first surface S1 of the substrate 110, and a second thin lens 1301 including a plurality of scatterers formed on the second surface S2 of the substrate 110.

As in the above-described embodiments, the first thin lens 1200 may be configured to correct geometric aberration of the second thin lens 1301, and the second thin lens 1301 may be configured to function as a lens with positive refractive power.

In the present embodiment, the second thin lens 1301 may have a scatterer arrangement of a plurality of layers. The second thin lens 1301 may include the second scatterers NS2 formed on the second surface S2 of the substrate 110, the low refractive index material layer 180 covering the second scatterers NS2 and including a material having a refractive index lower than the refractive index of the second scatterers NS2, and a plurality of third scatterers NS3 formed on the low refractive index material layer 180 and including a material having a refractive index higher than the refractive index of the low refractive index material layer 180. The second scatterers NS2 form a first layer LA1, and the third scatterers NS3 form a second layer LA2. A low refractive index material layer 185 that covers the third scatterers NS3 and including a material having a refractive index lower than the refractive index of the third scatterers NS3 may be further provided. The low refractive index material layer 185 may protect the third scatterers NS3 and may planarize an upper surface of the second thin lens 1301. The low refractive index material layer 185 may be omitted.

The second scatterers NS2 and the third scatterers NS3 may face each other to be misaligned with each other. This means that the center axes of at least some of the second scatterers NS2 and the third scatterers NS3 vertically facing each other may be misaligned with each other. Also, it is not limited to that all of the second scatterers NS2 and the third scatterers NS3 face each other to be misaligned with each other.

An interval d between the second scatterer NS2 and the third scatterer NS3, which are adjacent to each other, among the second scatterers NS2 and the third scatterers NS3, that is, a separation distance in a height direction (Z direction), may be greater than $\lambda/2$ with respect to the wavelength $\lambda$ within the predetermined wavelength band.

The arrangement of the second and third scatterers NS2 and NS3 in a multilayer is to reduce deterioration of performance that may occur at some positions even when the shape of each scatter is set to a desired target phase. In this regard, a description is presented with reference to FIGS. 25, 26, and 28 to 31.

Figure 28:
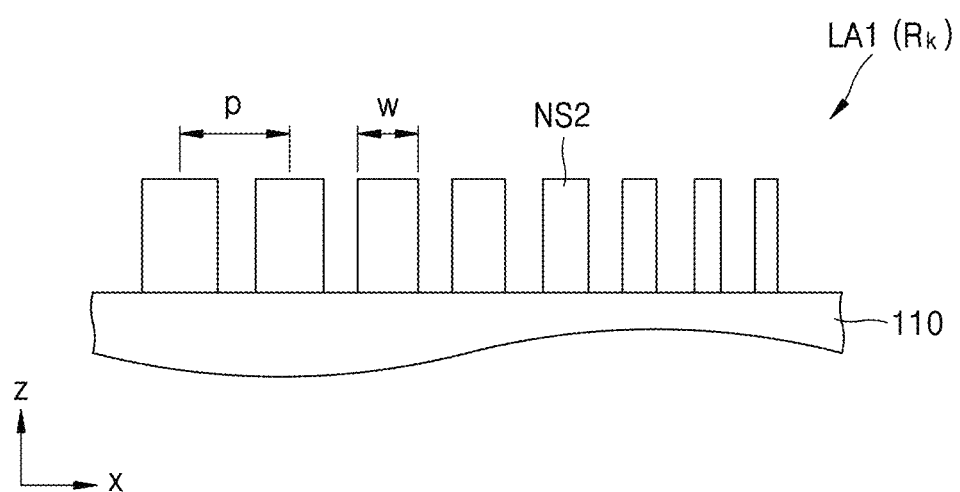
FIG. 28 is an exemplary diagram of the second scatterers arranged in one region of a first layer of the second thin lens in the focusing device of FIG. 27.

The classification of regions in FIG. 25 and the target phases of the respective regions in FIG. 26 may be applied to the second thin lens 1301 of FIG. 27. In other words, the sizes and arrangements of the second scatterers NS2 and the third scatterers NS3 arranged in the first layer LA1 and the second layer LA2 of the second thin lens 1301 may be set to satisfy the target phase of FIG. 26 for each region. FIG. 28 is an exemplary diagram of the second scatterers NS2 arranged in one region of the first layer LA1 of the second thin lens 1301 of FIG. 27. The arrangement rule of the width w and the pitch p may be repeated in a plurality of regions.

Figure 29:
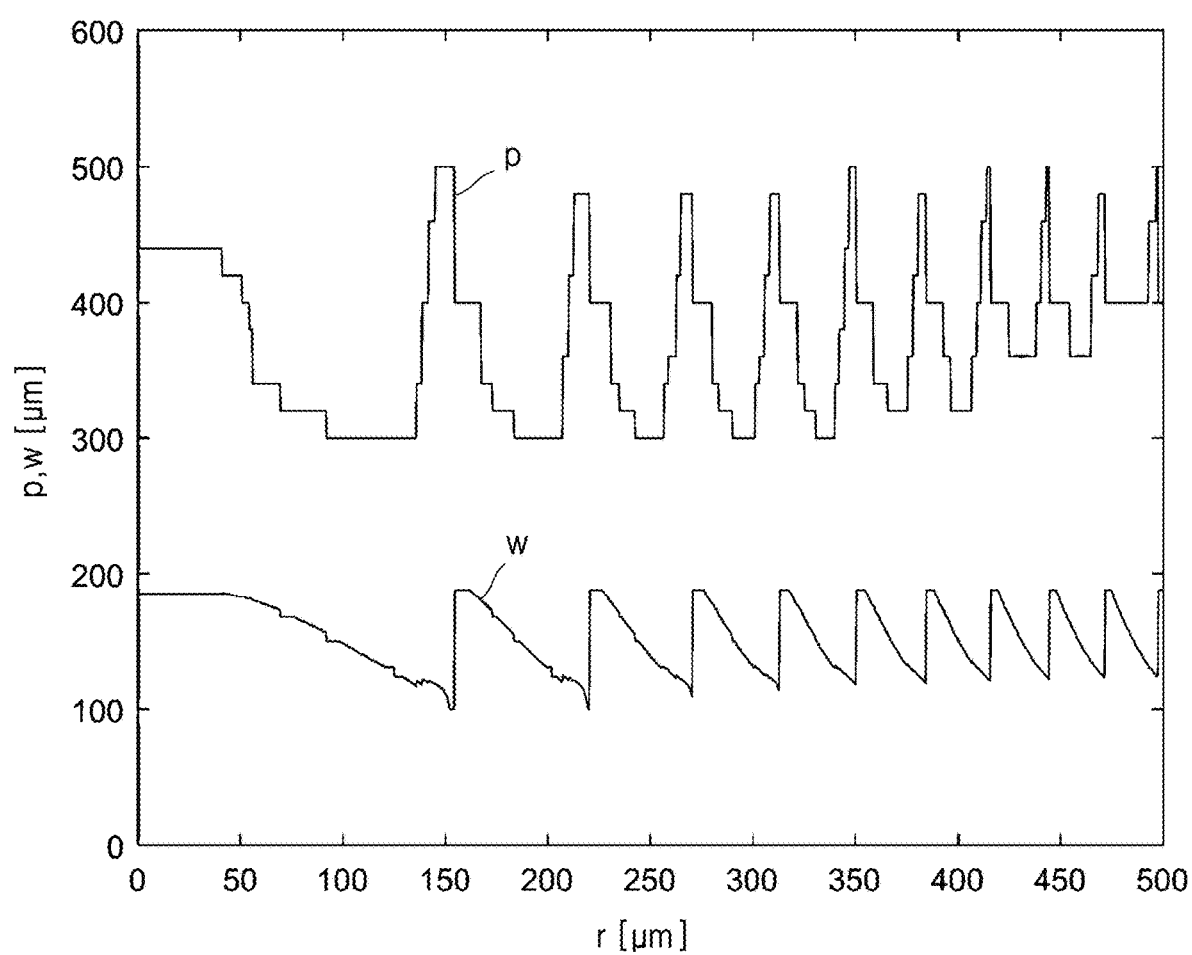
FIG. 29 is an exemplary diagram of design data of a pitch and a width by locations of the second scatterers arranged in the first layer of the second thin lens of the focusing device of FIG. 27.

FIG. 29 is an exemplary diagram of design data of the width w and the pitch p by locations of the second scatterers NS2 arranged in the first layer LA1 of the second thin lens 1301 of the focusing device 1001 of FIG. 27.

Figure 30:
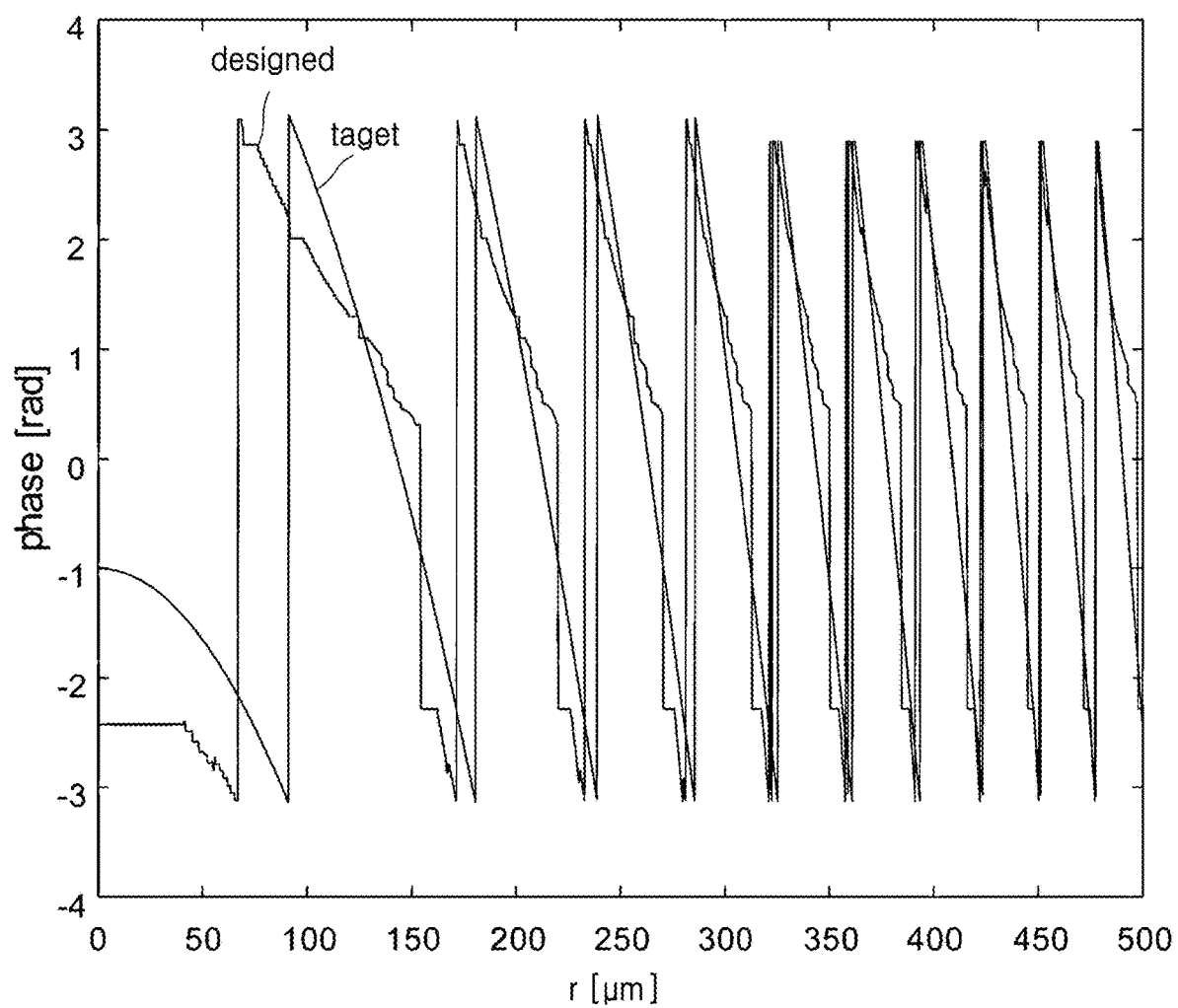
FIG. 30 is a graph of a comparison between a target phase value and a phase value by the scatterers designed as in FIG. 28.

FIG. 30 is a graph of a comparison between a target phase value and a phase value by the scatterers designed as in FIG. 28. In the graph, a target phase value graph is indicated by "target", and a phase value graph by the scatterers designed to implement the target phase is indicated by "designed". In the graph, the two graphs are not completely congruous with each other and have an error. Furthermore, a degree of mismatch appears to vary according to the position.

Figure 31:
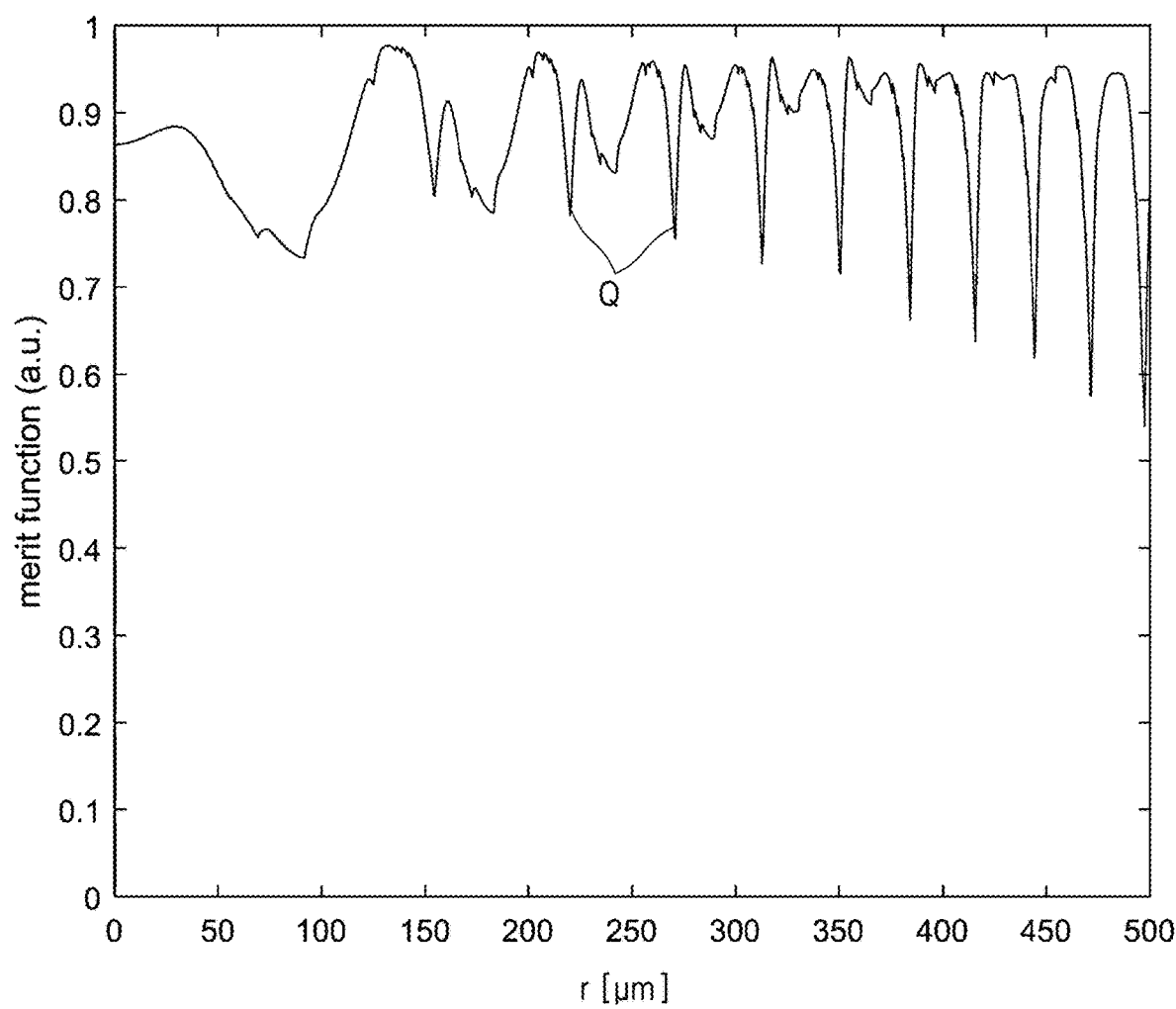
FIG. 31 is a graph of a performance index obtained by quantifying a difference between a target value and a design value in FIG. 30.

FIG. 31 is a graph of a performance index obtained by quantifying a difference between a target value and a design value in FIG. 30. The performance index is obtained such that correlation degree between a target transmissivity (transmission intensity and transmission phase) and an actual transmissivity in an entire wavelength band to be considered is integrated and quantified by locations in a radial direction. The graph may be referred to as the "merit function". The correlation degree is good as a value on the vertical axis of the graph is close to 1, and a position where the correlation degree is the lowest may be known from points Q indicating the lower extreme points.

FIGS. 29 to 31 illustrate the design data of the first layer LA1, and as multiple layers are introduced, correlation properties that are non-uniformly low may be compensated. For example, the rule regarding the size and arrangement of the third scatterers NS3 forming the second layer LA2 may be determined such that, as illustrated in FIG. 31, a position where correlation is low in the first layer LA1, for example, the extreme point Q, may be moved to another position. By making the position where correlation is low appear to be different in the first layer LA1 and the second layer LA2 and overlapping dispersion and phase features of each layer, when desired light of a predetermined wavelength band is to be focused while maintaining dispersion in an appropriate range, performance deterioration that may occur at some particular positions may be reduced.

The shape distribution of the second scatterers NS2 provided in the first layer LA1 and the shape distribution of the third scatterers NS3 provided in the second layer LA2 may be determined to have different distributions of performance index by locations from each other. The shape distribution of the second scatterers NS2 provided in the first layer LA1 and the shape distribution of the third scatterers NS3 provided in the second layer LA2 may be determined such that degree of non-uniformity of focusing performance by the respective shape distributions are different from each other. The shape distribution of the second scatterers NS2 provided in the first layer LA1 and the shape distribution of the third scatterers NS3 provided in the second layer LA2 may be determined such that degree of non-uniformity of focusing performance by locations in each layer may be compensated by each other. Any one of the first layer LA1 and the second layer LA2 may be set to alleviate the non-uniformity of focusing performance by the other layer.

As in the embodiment, when the scatterers are arranged in multiple layers in the second thin lens 1301, the number of "27 zones" to which a rule of a predetermined unit is applied may be reduced. The number of $2\pi$ zones $R_1, R_2, \ldots, R_k, \ldots, R_N$ as illustrated in FIG. 25 may be set to a level appropriate to achieve a desired refractive power, and the number of the regions increases for high refractive power. By using the multilayer arrangement, the number of regions formed in a radial direction may be reduced.

Although the number of multiple layers is set to, for example, two, the present disclosure is not limited thereto. For example, three or more layers may be selected. When the number of multiple layers is LN, the number of $2\pi$ zones formed in the radial direction may be reduced to 1/LN. Furthermore, the dispersion range may be reduced to 1/LN.

Figure 32:
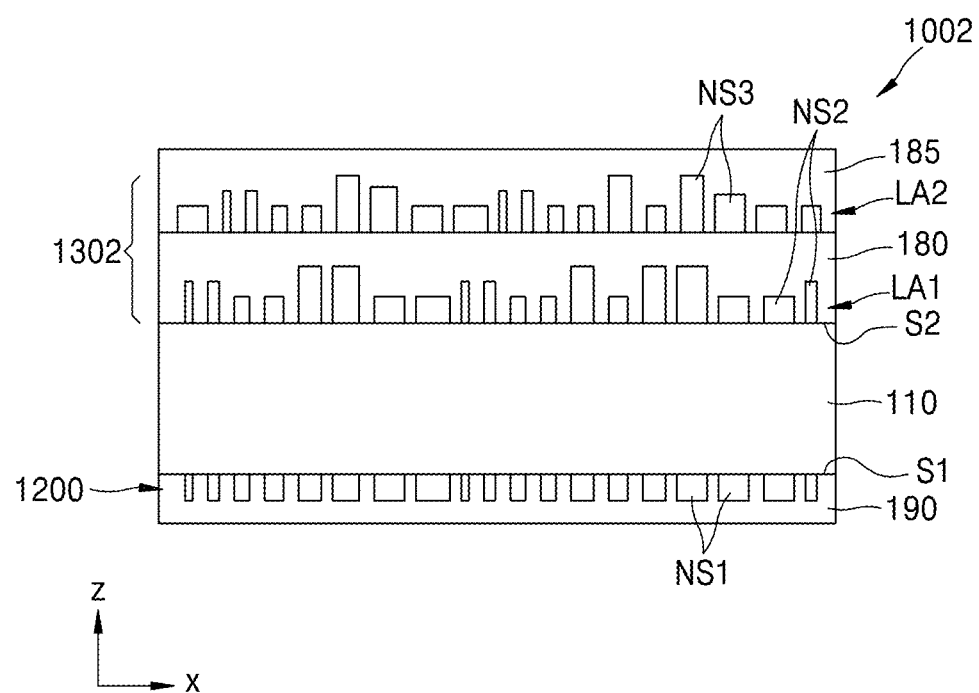
FIG. 32 is a diagram of a focusing device according to another exemplary embodiment.

FIG. 32 is a diagram of a focusing device 1002 according to another exemplary embodiment.

The focusing device 1002 may include the substrate 110, the first thin lens 1200 including the first scatterers NS1 formed on the first surface S1 of the substrate 110, and a second thin lens 1302 including a plurality of scatterers formed on the second surface S2 of the substrate 110 and arranged in a two layer structure.

In the present embodiment, at least two of the second scatterers NS2 forming the first layer LA1 of the second thin lens 1302 may have different heights from each other. Furthermore, at least two of the third scatterers NS3 forming the second layer LA2 of the second thin lens 1302 may have different heights from each other. As described in the embodiment of FIG. 24, by applying height variation to each layer, a design value to implement appropriate phase and dispersion at each position may be easy. In particular, when the multilayer scatterer arrangement is introduced to compensate for the deterioration of performance of each layer, the selection of a design value of a scatterer to mutually compensate for the deterioration of performance of one layer in another layer corresponding to a low correlation position may be easier. Furthermore, effective compensation of the phase and the dispersion performance between layers may be possible.

Although the drawing illustrates that the second and third scatterers NS2 and NS3 having various heights are applied to both of the first layer LA1 and the second layer LA2, this is merely exemplary and the present disclosure is not limited thereto. For example, the scatterers may be arranged with a constant height in one of the first layer LA1 and the second layer LA2, and the scatterers having a different height may be selected in the other layer at an appropriately position as necessary.

Figure 33:
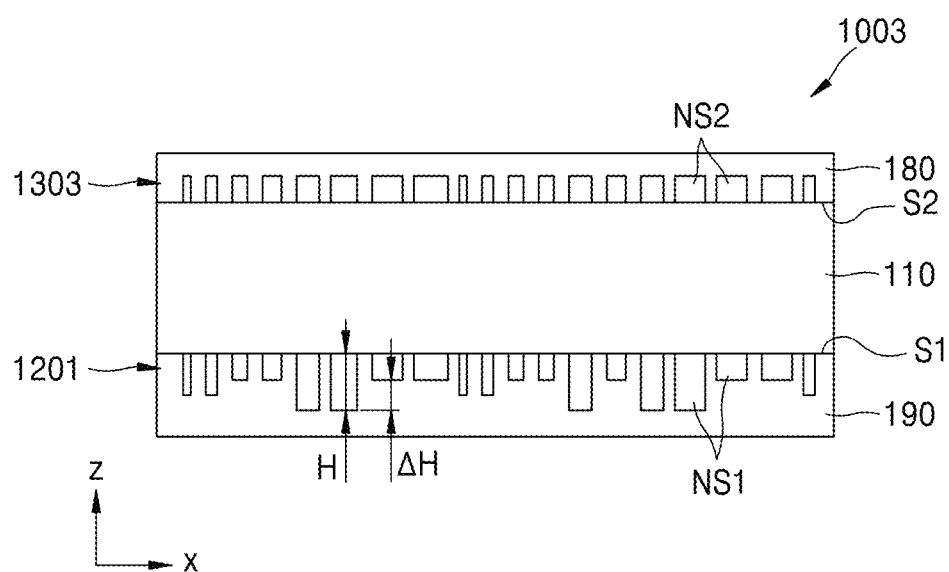
FIG. 33 is a diagram of a focusing device according to another exemplary embodiment.

FIG. 33 is a diagram of a focusing device 1003 according to another exemplary embodiment.

Referring to FIG. 33, the focusing device 1003 may include the substrate 110, a first thin lens 1201 including the first scatterers NS1 formed on the first surface S1 of the substrate 110, and a second thin lens 1303 including the second scatterers NS2 formed on the second surface S2 of the substrate 110.

The first scatterers NS1 of the first thin lens 1201 may be configured to correct geometric aberration of the second thin lens 1303, and the second scatterers NS2 may be configured such that in the second thin lens 1303 may function as a lens with positive refractive power.

In the present embodiment, at least two of the first scatterers NS1 of the first thin lens 1201 may have different heights H from each other. The height difference $\Delta H$ of at least two first scatterers NS1 may be equal to or less than $2\lambda$ with respect to wavelength $\lambda$ in the focusing wavelength band. The height H of the first scatterers NS1 may be in a range that $\lambda/2 \leq H \leq 3\lambda$, with respect to the wavelength $\lambda$ of the focusing wavelength band.

As described above, the geometric aberration signifies a phenomenon that light incident in a direction that is not parallel to the optical axis of the focusing device 1003 is not focused on one focusing point. The geometric aberration of the second thin lens 1303 may be corrected by setting the shape distribution of the first scatterers NS1 in the first thin lens 1201. A target phase to be implemented by locations may be set for the correction of geometric aberration. To achieve the target phase, the effect of correcting geometric aberration may be increased by selecting various heights of the first scatterers NS1.

Figure 34:
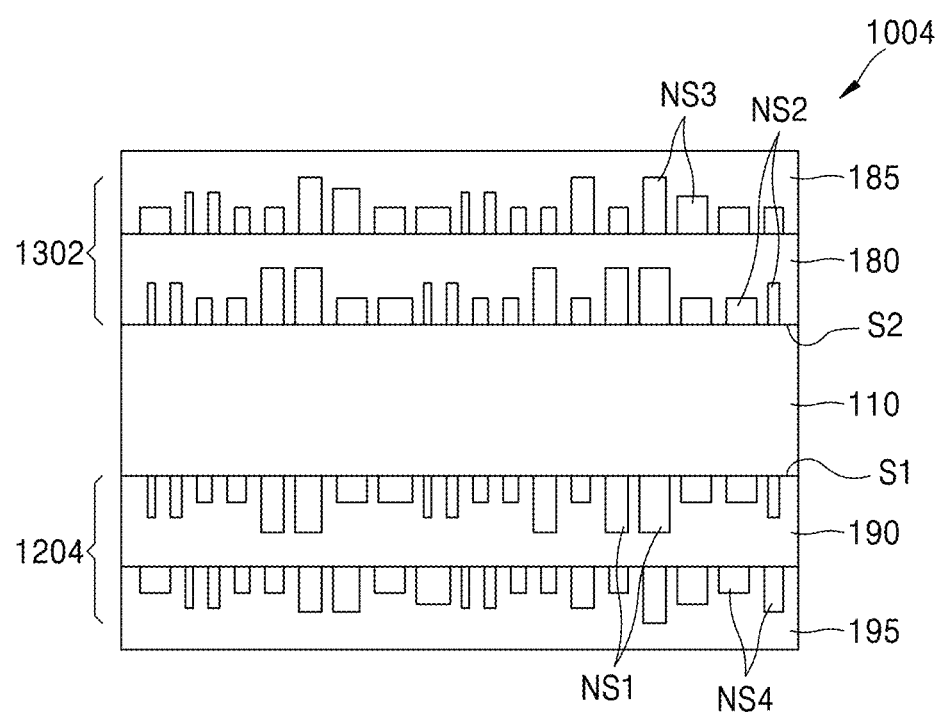
FIG. 34 is a diagram of a focusing device according to another exemplary embodiment.

FIG. 34 is a diagram of a focusing device 1004 according to another exemplary embodiment.

Referring to FIG. 34, the focusing device 1004 may include the substrate 110, a first thin lens 1204 including a plurality of scatterers arranged in a double layer structure on the first surface S1 of the substrate 110, and the second thin lens 1302 including a plurality of scatterers arranged in a double layer structure on the second surface S2 of the substrate 110.

The first thin lens 1204 may include the first scatterers NS1 arranged on the first surface S1 of the substrate 110, the low refractive index material layer 190 covering the first scatterers NS1 and including a material having a refractive index lower than the refractive index of the first scatterers NS1, and a plurality of fourth scatterers NS4 arranged on the low refractive index material layer 190 and including a material having a refractive index higher than the refractive index of the low refractive index material layer 190. Furthermore, a low refractive index material layer 195 having a refractive index lower than the refractive index of the fourth scatterers NS4 may be further provided to cover and protect the fourth scatterers NS4.

The second thin lens 1302 may include the second scatterers NS2 arranged on the second surface S2 of the substrate 110, the low refractive index material layer 180 covering the second scatterers NS2, and the third scatterers NS3 arranged on the low refractive index material layer 180. Furthermore, the low refractive index material layer 185 having a refractive index lower than the refractive index of the third scatterers NS3 may be further provided to cover and protect the third scatterers NS3.

In the present embodiment, the scatterers are arranged in a double layer structure on each of the first thin lens 1204 for correcting geometric aberration and the second thin lens 1302 for focusing light of a predetermined wavelength band with less color dispersion. Different heights may be applied to the first scatterers NS1, the fourth scatterers NS4, the second scatterers NS2, and the third scatterers NS3, which form the respective layers.

Although, in the drawing, the scatterer arrangement of a multi-layered structure is applied to both of the first thin lens 1204 and the second thin lens 1302 and height variation is applied to all layers, this is merely exemplary and the present disclosure is not limited thereto. For the aberration correction and focusing effect suitable for each lens, an appropriate combination of multilayer arrangement and height variation may be selected to mutually compensate for the performance deterioration of each layer and extend the phase-dispersion map including design data to be selected therefor.

Although the two thin lenses included in each of the above-described embodiments are formed on both sides of the substrate 110, this is merely exemplary. For example, the two thin lenses may be formed on different substrates and fixed such that an appropriate interval therebetween may be maintained by a predetermined support member.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A focusing device with respect to light of a predetermined wavelength band, the focusing device comprising:
a substrate;
a first thin lens provided at a first surface of the substrate and comprising a plurality of first scatterers; and
a second thin lens provided at a second surface of the substrate and comprising a plurality of second scatterers,
wherein the plurality of first scatterers of the first thin lens are configured to correct geometric aberration of the second thin lens, and
wherein at least two of the plurality of second scatterers have different heights from each other.

2. The focusing device of claim 1, wherein a height difference between the at least two second scatterers is equal to or less than 2λ with respect to a wavelength λ within the predetermined wavelength band.

3. The focusing device of claim 1, wherein a height H of the plurality of second scatterers is in a range that λ/2≤H≤3λ, with respect to a wavelength λ within the predetermined wavelength band.

4. The focusing device of claim 1, wherein the second thin lens further comprises:
a low refractive index material layer covering the plurality of second scatterers and including a material having a refractive index lower than a refractive index of the plurality of second scatterers; and
a plurality of third scatterers arranged on the low refractive index material layer and including a material having a refractive index higher than a refractive index of the low refractive index material layer.

5. The focusing device of claim 4, wherein the plurality of second scatterers and the plurality of third scatterers face each other to be misaligned with each other.

6. The focusing device of claim 4, wherein a separation distance in a height direction between adjacent second and third scatterers among the plurality of second scatterers and the plurality of third scatterers is greater than λ/2, with respect to the wavelength λ within the predetermined wavelength band.

7. The focusing device of claim 4, wherein a shape distribution of the plurality of second scatterers and a shape distribution of the plurality of third scatterers are determined to have different distributions of performance indexes by locations from each other.

8. The focusing device of claim 7, wherein the shape distribution of the plurality of second scatterers and the shape distribution of the plurality of third scatterers are determined to mutually compensate for non-uniformity in focusing performance by locations.

9. The focusing device of claim 4, wherein at least two of the plurality of third scatterers have different heights from each other.

10. The focusing device of claim 9, wherein a height difference between at least two of the plurality of third scatterers is equal to or less than 2λ, with respect to the wavelength λ within the predetermined wavelength band.

11. The focusing device of claim 4, wherein a height H of a plurality of fourth scatterers is in a range that λ/2≤H≤3λ, with respect to the wavelength λ within the predetermined wavelength band.

12. The focusing device of claim 1, wherein at least two of the plurality of first scatterers have different heights from each other.

13. The focusing device of claim 1, wherein the first thin lens further comprises:
a low refractive index material layer covering the plurality of first scatterers and including a material having a refractive index lower than a refractive index of the first scatterer; and
a plurality of fourth scatterers arranged on the low refractive index material layer and including a material having a refractive index higher than a refractive index of the low refractive index material layer.

14. The focusing device of claim 13, wherein the plurality of first scatterers and the plurality of fourth scatterers face each other to be misaligned with each other.

15. The focusing device of claim 13, wherein a separation distance in a height direction between adjacent first and fourth scatterers among the plurality of first scatterers and the plurality of fourth scatterers is equal to or less than λ/2, with respect to the wavelength λ within the predetermined wavelength band.

16. The focusing device of claim 1, wherein the first and the second thin lenses are configured to allow light to form a focusing point on a focal plane.

17. The focusing device of claim 1, wherein a phase shift of light that passes through the plurality of second scatterers decreases from a central area of the second thin lens to a peripheral area of the second thin lens.

18. The focusing device of claim 17, wherein a phase shift of light that passes through the plurality of first scatterers decreases from a peripheral area of the first thin lens to a middle area of the first thin lens and increases from the middle area of the first thin lens to a central area of the first thin lens.

19. The focusing device of claim 16, wherein the first and the second thin lenses are configured to change a location of the focusing point according to an angle at which the light is incident on the first surface.

20. The focusing device of claim 19, wherein the first and the second thin lenses area configured to determine the location of the focusing point according to Equation 1:

$$h = f * \tan\theta$$

wherein 'h' is a distance between the location of the focusing point and an optical axis of the focusing device, 'f' is an effective focal length of the focusing device, and 'θ' is the angle at which the light is incident on the first surface.

* * * * *